(12) United States Patent
Ikeda

(10) Patent No.: US 10,645,743 B2
(45) Date of Patent: May 5, 2020

(54) TERMINAL APPARATUS, COMMUNICATION SYSTEM, COMPUTER-READABLE RECORDING MEDIUM, AND DISPLAY CONTROL METHOD

(71) Applicant: SEIKO EPSON CORPORATION, Tokyo (JP)

(72) Inventor: Iwane Ikeda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/286,398

(22) Filed: Feb. 26, 2019

(65) Prior Publication Data

US 2019/0268955 A1 Aug. 29, 2019

(30) Foreign Application Priority Data

Feb. 27, 2018 (JP) ................. 2018-032858

(51) Int. Cl.
| | |
|---|---|
| *H04W 76/15* | (2018.01) |
| *H04W 76/14* | (2018.01) |
| *G06F 3/12* | (2006.01) |
| *H04W 72/12* | (2009.01) |
| *H04B 7/00* | (2006.01) |

(52) U.S. Cl.
CPC .......... *H04W 76/15* (2018.02); *G06F 3/1236* (2013.01); *G06F 3/1292* (2013.01); *H04B 7/00* (2013.01); *H04W 72/1226* (2013.01); *H04W 76/14* (2018.02)

(58) Field of Classification Search
CPC ...................................................... H04W 76/15
USPC ........................................................ 358/1.15
See application file for complete search history.

(56) References Cited

U.S. PATENT DOCUMENTS

| | | | | |
|---|---|---|---|---|
| 8,340,580 | B1 * | 12/2012 | Epstein | H04B 1/1027 455/114.2 |
| 10,338,860 | B2 * | 7/2019 | Goto | H04B 17/318 |
| 2016/0360477 | A1 | 12/2016 | Saeki et al. | |
| 2017/0208427 | A1 * | 7/2017 | Goto | H04B 17/27 |
| 2018/0341442 | A1 * | 11/2018 | Nagasawa | G06F 3/1222 |
| 2019/0265922 | A1 * | 8/2019 | Ikeda | G06F 3/1236 |
| 2019/0265923 | A1 * | 8/2019 | Ikeda | G06F 3/1236 |
| 2019/0265924 | A1 * | 8/2019 | Ikeda | G06F 3/1236 |

FOREIGN PATENT DOCUMENTS

JP 2015-200989 A 11/2015

* cited by examiner

*Primary Examiner* — Jacky X Zheng
(74) *Attorney, Agent, or Firm* — Workman Nydegger

(57) ABSTRACT

Provided is a terminal apparatus including a first wireless communication interface that performs wireless communication with an electronic apparatus using a first wireless communication scheme, a second wireless communication unit that performs wireless communication with the electronic apparatus using a second wireless communication scheme, and a processor. The processor performs processing that displays on a display a display image that is based on information on the degree of radio wave interference in communication with the electronic apparatus in compliance with the first wireless communication scheme and information on a distance to the electronic apparatus, which is obtained based on a beacon signal that is received using the second wireless communication scheme.

10 Claims, 13 Drawing Sheets

FIG. 7

| BEACON IDENTIFIER | IDENTIFICATION INFORMATION ON ELECTRONIC APPARATUS (MAC ADDRESS) | STATUS INFORMATION ON ELECTRONIC APPARATUS |
|---|---|---|

FIG. 8

| IDENTIFICATION INFORMATION | SSID | INFORMATION ON DEGREE OF RADIO WAVE INTERFERENCE | DISTANCE INFORMATION | STATUS INFORMATION |
|---|---|---|---|---|
| MAC ADDRESS 1 | SSID1 | SMALL | 1 | IDLE STATUS |
| MAC ADDRESS 2 | SSID2 | HIGH | 2 | IDLE STATUS |
| MAC ADDRESS 3 | SSID3 | HIGH | — | — |
| MAC ADDRESS 4 | SSID4 | MIDDLE | 3 | ERROR STATUS |
| MAC ADDRESS 5 | SSID5 | HIGH | 3 | IDLE STATUS |
| MAC ADDRESS 6 | SSID6 | HIGHEST | 4 | OPERATING STATUS |
| MAC ADDRESS 7 | SSID7 | HIGHEST | — | — |

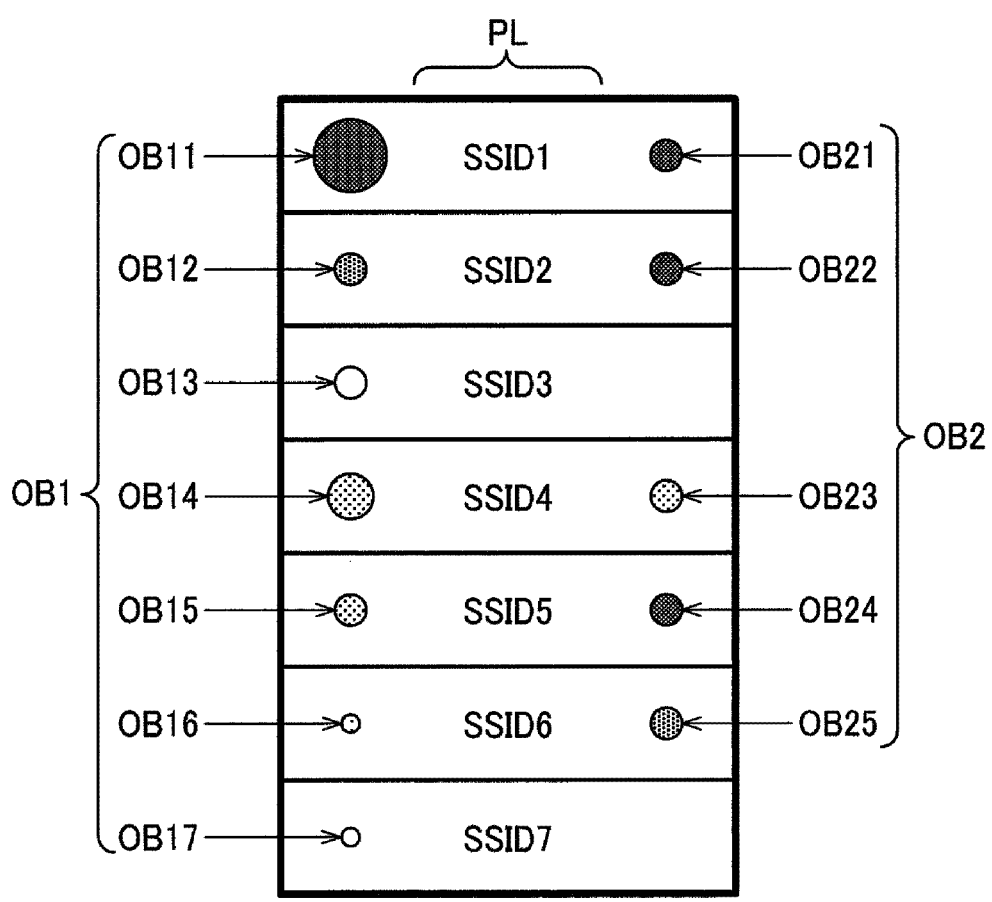

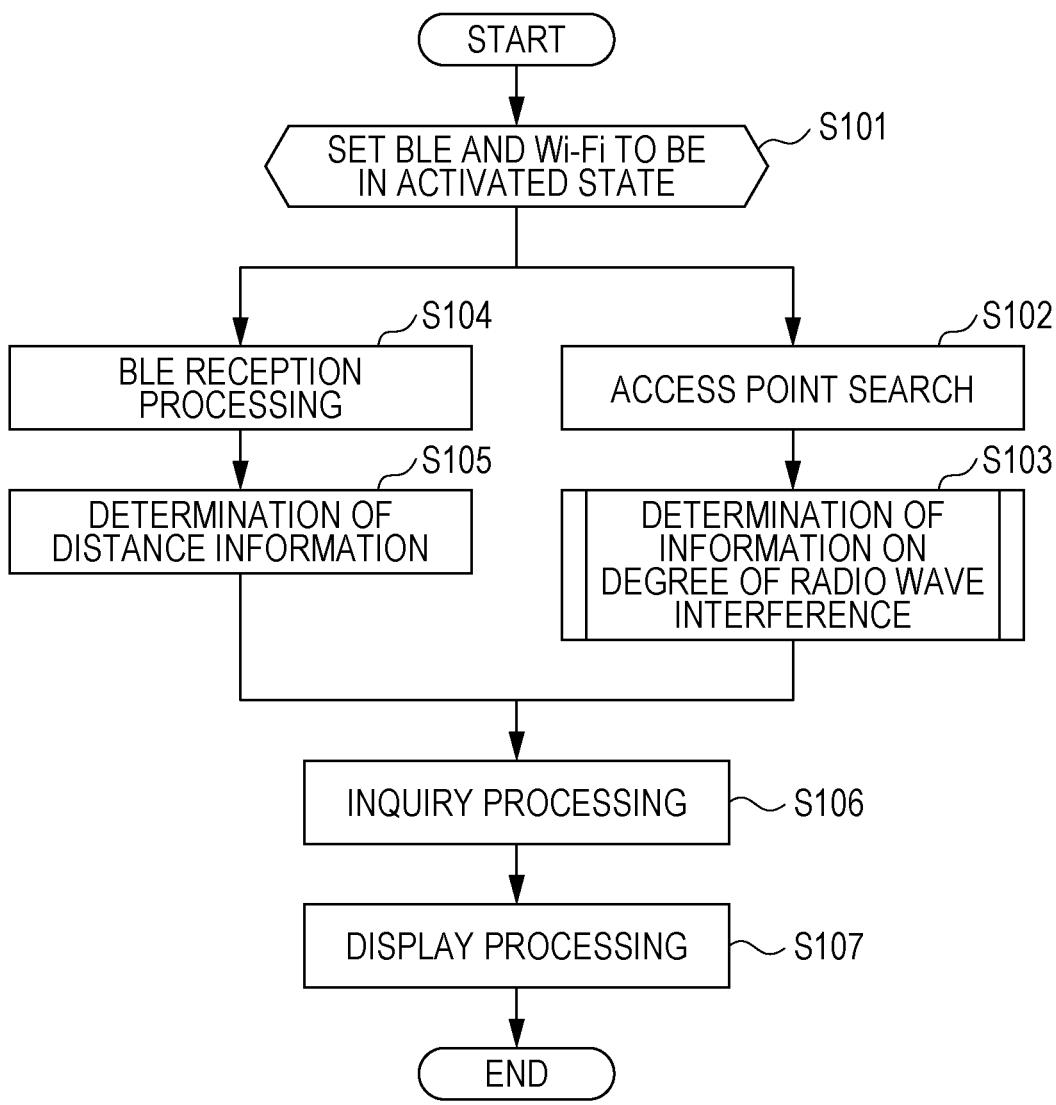

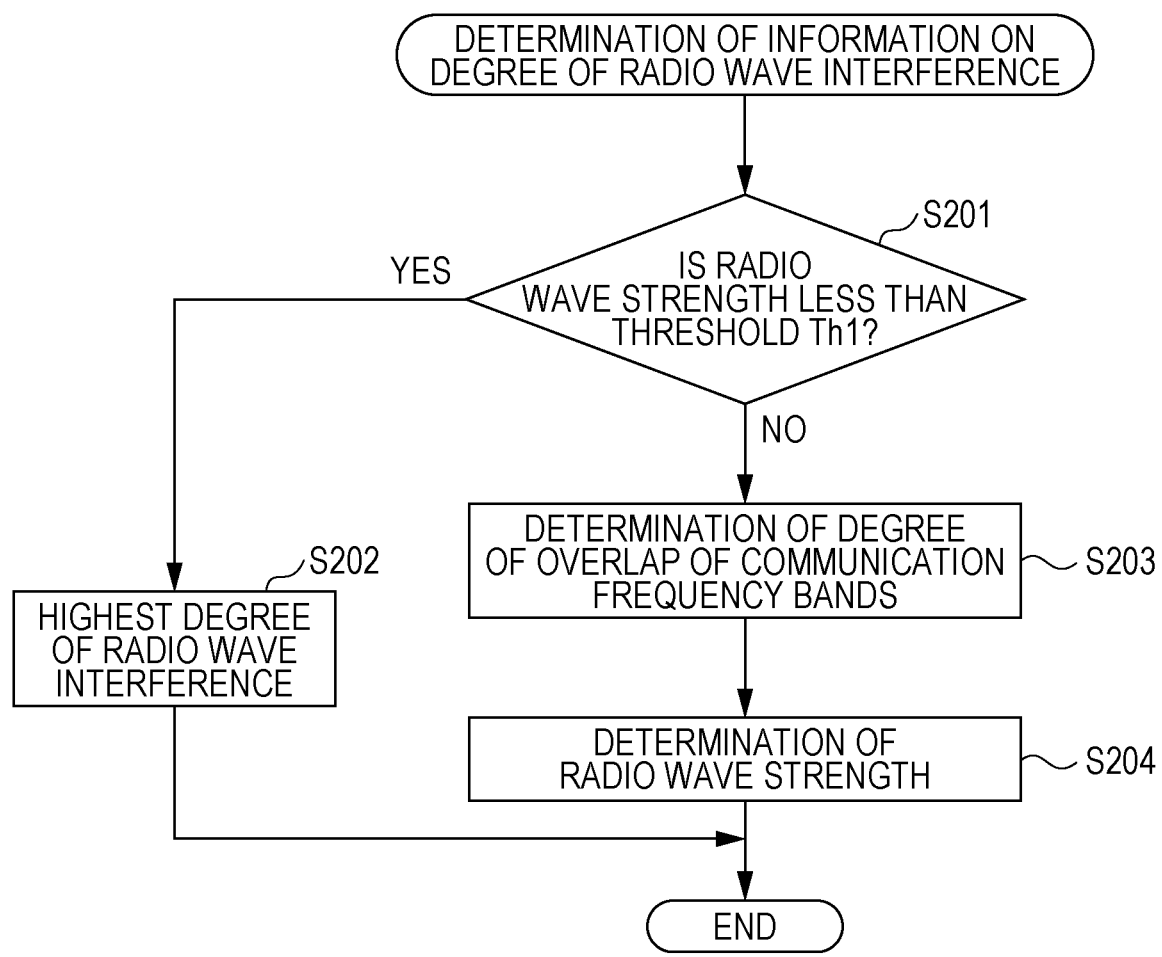

| BEACON IDENTIFIER | IDENTIFICATION INFORMATION ON ELECTRONIC APPARATUS (MAC ADDRESS) | STATUS INFORMATION ON ELECTRONIC APPARATUS | SSID | PASSWORD |
|---|---|---|---|---|

| BEACON IDENTIFIER | IDENTIFICATION INFORMATION ON ELECTRONIC APPARATUS (MAC ADDRESS) | STATUS INFORMATION ON ELECTRONIC APPARATUS | REFERENCE RADIO WAVE STRENGTH |
|---|---|---|---| ns
TERMINAL APPARATUS, COMMUNICATION SYSTEM, COMPUTER-READABLE RECORDING MEDIUM, AND DISPLAY CONTROL METHOD

BACKGROUND

1. Technical Field

The present invention relates to a terminal apparatus, a communication system, a computer-readable recording medium, and a display control method.

2. Related Art

In the related art, terminal apparatuses each of which performs communication with an electronic apparatus using a wireless communication scheme such as a wireless LAN are known. The wireless LAN, for example, is for communication that complies with Wi-Fi (a registered trademark) standards. As this terminal apparatus, a smartphone or the like is considered that transmits print data to an electronic apparatus that is a printer, through wireless communication which complies with Wi-Fi standards.

Furthermore, a technique is also known that uses wireless communication in compliance with a different wireless communication scheme when a connection in compliance with a given wireless communication scheme is established. In JP-A-2015-200989, a portable terminal is disclosed that detects a printer which is at the most shortest distance using Bluetooth Low Energy (BLE) radio (Bluetooth is a registered trademark) wave strength and that transmits print data to the detected printer through a wireless LAN. Furthermore, in JP-A-2015-200989, it is also disclosed that the printer that is detected with BLE is list-displayed.

With a technique in JP-A-2015-200989, the specification of an electronic apparatus that is at a short distance may be possible, or a display that results from considering a positional relationship to the terminal apparatus may be possible. However, in JP-A-2015-200989, Wi-Fi information when selecting and displaying an electronic apparatus is not considered.

In recent years, the number of electronic apparatuses that functions as access points have increased. Furthermore, public wireless LAN services, such as a Wi-Fi spot, are satisfactory, and mobile Wi-Fi routers are in wide use. For this reason, the number of cases where many access points are present in the vicinity of a terminal apparatus 100 increases. There is a concern that due to radio wave interference among multiple access points, connection releasing or a decrease in communication speed will take place depending on the situation of wireless in the neighborhood. With a technique in JP-A-2015-200989, which does not consider this radio wave interference, it is difficult to set a suitable electronic apparatus to be a connection target.

SUMMARY

An advantage of some aspects of the invention is to provide a terminal apparatus, a communication system, a computer-readable recording medium, and a display control method, which are capable of establishing a wireless connection to a suitable electronic apparatus.

According to an aspect of the invention, there is provided a terminal apparatus including: a first wireless communication unit that performs wireless communication with an electronic apparatus using a first wireless communication scheme; a second wireless communication unit that performs wireless communication with the electronic apparatus using a second wireless communication scheme different from the first wireless communication scheme; and a processing unit that performs communication control of the first wireless communication unit and the second wireless communication unit, in which the processing unit performs processing that displays on a display unit a display image that is based on information on the degree of radio wave interference in communication with the electronic apparatus in compliance with the first wireless communication scheme, and information on a distance to the electronic apparatus, which is obtained based on a beacon signal that is received using the second wireless communication scheme.

Furthermore, in the terminal apparatus, the processing unit may obtain the information on the degree of radio wave interference, based on the degree of overlap of communication frequency bands that are used for wireless communication in compliance with the first wireless communication scheme, and on a radio wave strength of a radio wave that is used for wireless communication in compliance with the first wireless communication scheme.

Furthermore, in the terminal apparatus, the first wireless communication unit may perform communication in a 2.4 GHz band that complies with WI-Fi standards, or communication in a 5 GHz band, and the processing unit may obtain the information on the degree of radio wave interference based on the degree of overlap of the communication frequency bands, the radio wave strength, and which one of the 2.4 GHz band and the 5 GHz band is used to perform wireless communication.

Furthermore, in the terminal apparatus, in a case where it is determined that a distance that is indicated by the information on the distance is at or below a given threshold, the processing unit may obtain the information on the degree of radio wave interference, in such a manner that the degree of radio wave interference in a case where the wireless communication in compliance with the first wireless communication scheme is in the 5 GHz band is lower than the degree of radio wave interference in a case where the wireless communication in compliance with the first wireless communication scheme is in the 2.4 GHz band.

Furthermore, in the terminal apparatus, the first wireless communication unit may search for the electronic apparatus available for communication, using the first wireless communication scheme, and the processing unit may list-display the multiple electronic apparatuses that are found as a result of the search, and performs processing that displays on the display unit the display image in a display mode, which results from associating an object that indicates the information on the degree of radio wave interference and the information on the distance in an identifiable manner, with each of the list-displayed multiple electronic apparatuses.

Furthermore, in the terminal apparatus, the second wireless communication unit may acquire status information on the electronic apparatus that transmits the beacon signal, based on the beacon signal, and the processing unit may perform processing that displays on the display unit the display image in the display mode, which results from associating a second object that indicates the status information in an identifiable manner, with each of the list-displayed multiple electronic apparatuses.

Furthermore, in the terminal apparatus, the second wireless communication unit may acquire connection information that is used for the first wireless communication scheme, using the second wireless communication scheme, and the first wireless communication unit may establish a connection to the electronic apparatus available for communication using the first wireless communication scheme, through the use of the connection information.

According to another aspect of the invention, there is provided a communication system including the terminal apparatus described above and the electronic apparatus.

According to still another aspect of the invention, there is provided a computer-readable recording medium on which a program is stored, the program causing a computer to function as: a first wireless communication unit that performs wireless communication with an electronic apparatus using a first wireless communication scheme; a second wireless communication unit that performs wireless communication with the electronic apparatus using a second wireless communication scheme different from the first wireless communication scheme; and a processing unit that performs communication control of the first wireless communication unit and the second wireless communication unit, in which the processing unit performs processing that displays on a display unit a display image that is based on information on the degree of radio wave interference in communication with the electronic apparatus available for communication in compliance with the first wireless communication scheme, and information on a distance to the electronic apparatus, which is obtained based on a beacon signal that is received using the second wireless communication scheme.

According to still another aspect of the invention, there is provided a display control method including: obtaining information on the degree of radio wave interference in communication with an electronic apparatus using a first wireless communication scheme; obtaining information on a distance to the electronic apparatus based on a beacon signal that is received from the electronic apparatus using a second wireless communication scheme different from the first wireless communication scheme; and performing processing that displays on a display unit a display image that is based on the information on the degree of radio wave interference and the information on the distance.

BRIEF DESCRIPTION OF THE DRAWINGS

The invention will be described with reference to the accompanying drawings, wherein like numbers reference like elements.

FIG. 7 is a diagram illustrating an example of a data structure of a BLE beacon signal.

FIG. 8 is a diagram illustrating an example of data that results from collation processing.

FIG. 9 is a diagram illustrating an example of a display image.

FIG. 10 is a flowchart for describing processing in the terminal apparatus.

FIG. 11 is a flowchart for describing processing that obtains information on the degree of radio wave interference.

DESCRIPTION OF EXEMPLARY EMBODIMENTS

The present embodiment will be described below. It is noted that the present embodiment which will be described below does not improperly limit the subject matter of the invention that is claimed in a claim. Furthermore, all configurations that will be described in the present embodiment are not necessarily configurational requirements for the invention.

1. Example of a Configuration of a System

Figure 1:
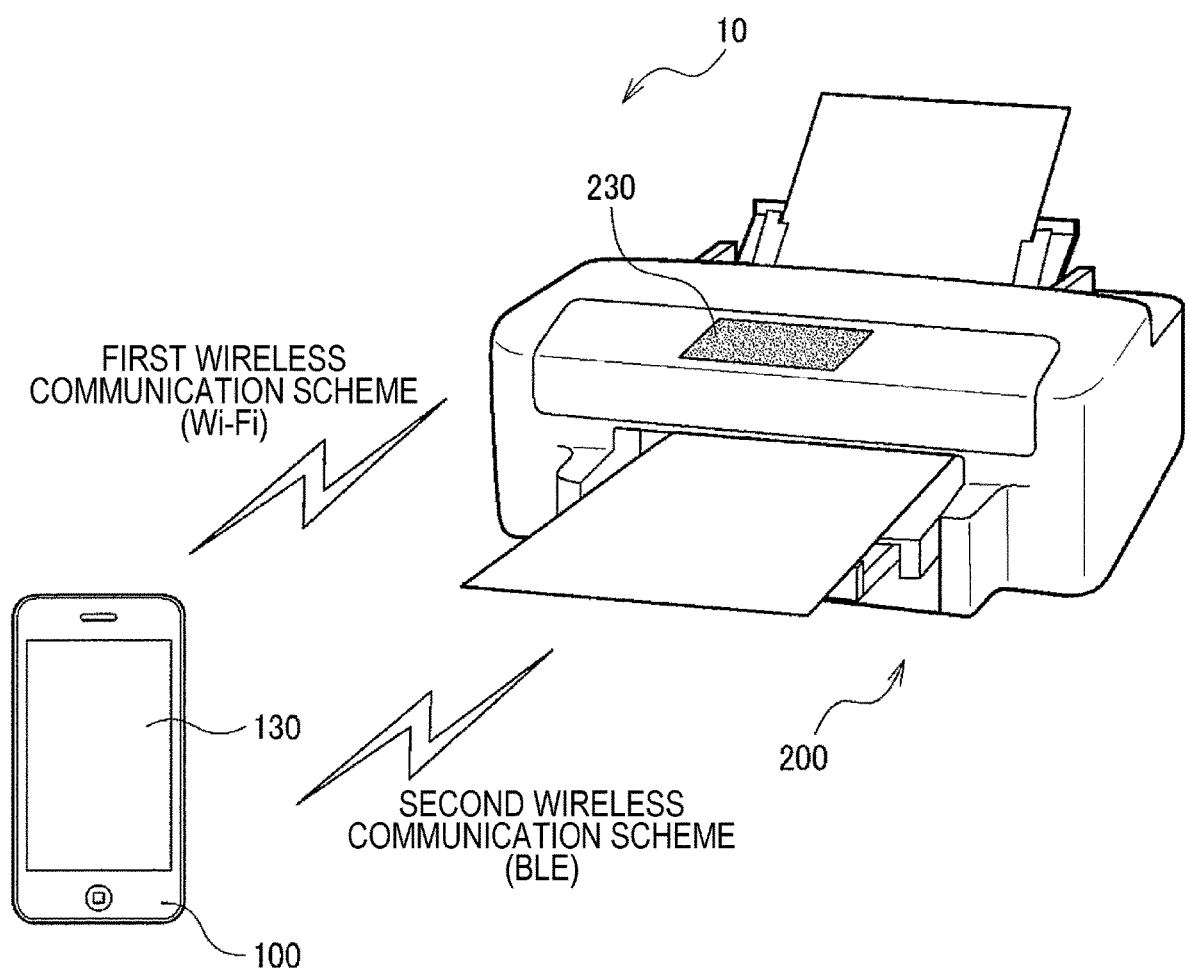
FIG. 1 is a diagram illustrating an example of a configuration of a communication system.

FIG. 1 is a diagram schematically illustrating an example of a communication system 10 that includes a terminal apparatus 100 according to the invention. The communication system 10 includes the terminal apparatus 100 and an electronic apparatus 200.

The terminal apparatus 100 is a portable terminal apparatus, such as a smartphone or a tablet terminal. However, the terminal apparatus 100 may be any other apparatus such as a personal computer (PC).

The electronic apparatus 200, for example, is a printer. Alternatively, the electronic apparatus 200 may be a scanner, a facsimile machine, or a copy machine. The electronic apparatus 200 may be a multifunction peripheral (MFP) that has multiple functions, and a multifunction peripheral that has a printing function is also an example of the printer. The electronic apparatus 200 according to the present embodiment is possibly searched for by the terminal apparatus 100 using a first wireless communication scheme, and examples of the electronic apparatus 200 include further any arbitrary apparatus that possibly transmits a beacon signal in compliance with a second wireless communication scheme. The electronic apparatus 200 may be a projector, a head-mounted display device, a wearable device, a biological information measuring instrument, such as a pulse meter or a physical activity meter, a robot, a video apparatus, such as a camera, a portable information terminal, such as a smartphone, a physical quantity measuring instrument, or the like.

As illustrated in FIG. 1, the terminal apparatus 100 and the electronic apparatus 200 possibly perform wireless communication in compliance with the first wireless communication scheme and wireless communication in compliance with the second wireless communication scheme.

From the perspective of standards, a communication speed is higher in the first wireless communication scheme than in the second wireless communication scheme. The first wireless communication scheme is a wireless LAN in a narrow sense, and, more specifically, Wi-Fi. An example will be described below in which the first wireless communication scheme is Wi-Fi, but it is possible that the first wireless communication scheme may be any other communication scheme.

The terminal apparatus 100 makes a direct contact to the electronic apparatus 200. Specifically, the electronic apparatus 200 activates an internal access point and the terminal apparatus 100 makes a connection to the internal access point, and thus communication is directly performed between the terminal apparatus 100 and the electronic apparatus 200. The direct connection between the terminal apparatus 100 and the electronic apparatus 200 may be made through communication in compliance with Wi-Fi Direct (WFD) standards, and may be performed in a Wi-Fi ad hoc mode.

However, as will be described with reference to FIG. 13, the terminal apparatus 100 may make a connection to the electronic apparatus 200 through any other apparatus such as a wireless LAN router. For example, in a case where the electronic apparatus 200 operates in an infrastructure mode and connects to a given external access point, the terminal apparatus 100 makes a wireless connection to the external access point, and thus communication is performed between the terminal apparatus 100 and the electronic apparatus 200. In this case, the connection between the electronic apparatus 200 and the external access point is not limited to the wireless connection and may be realized in a wired manner.

From the perspective of standards, a communication speed is high and transmission of the beacon signal is possible in the first wireless communication scheme, compared with the second wireless communication scheme. The second wireless communication scheme is Bluetooth in a narrow sense, and, more precisely, for BLE. An example will be described below in which the second wireless communication scheme refers to BLE, but it is possible that the first wireless communication scheme may be any other communication scheme. The beacon signal in compliance with BLE corresponds to an advertisement packet. It is noted that the transmission of the beacon signal is possible with the first wireless communication scheme without any constraint. If the first wireless communication scheme is Wi-Fi, the electronic apparatus 200 transmits a beacon signal that makes service set identifier (SSID) of its own known.

Figure 2:
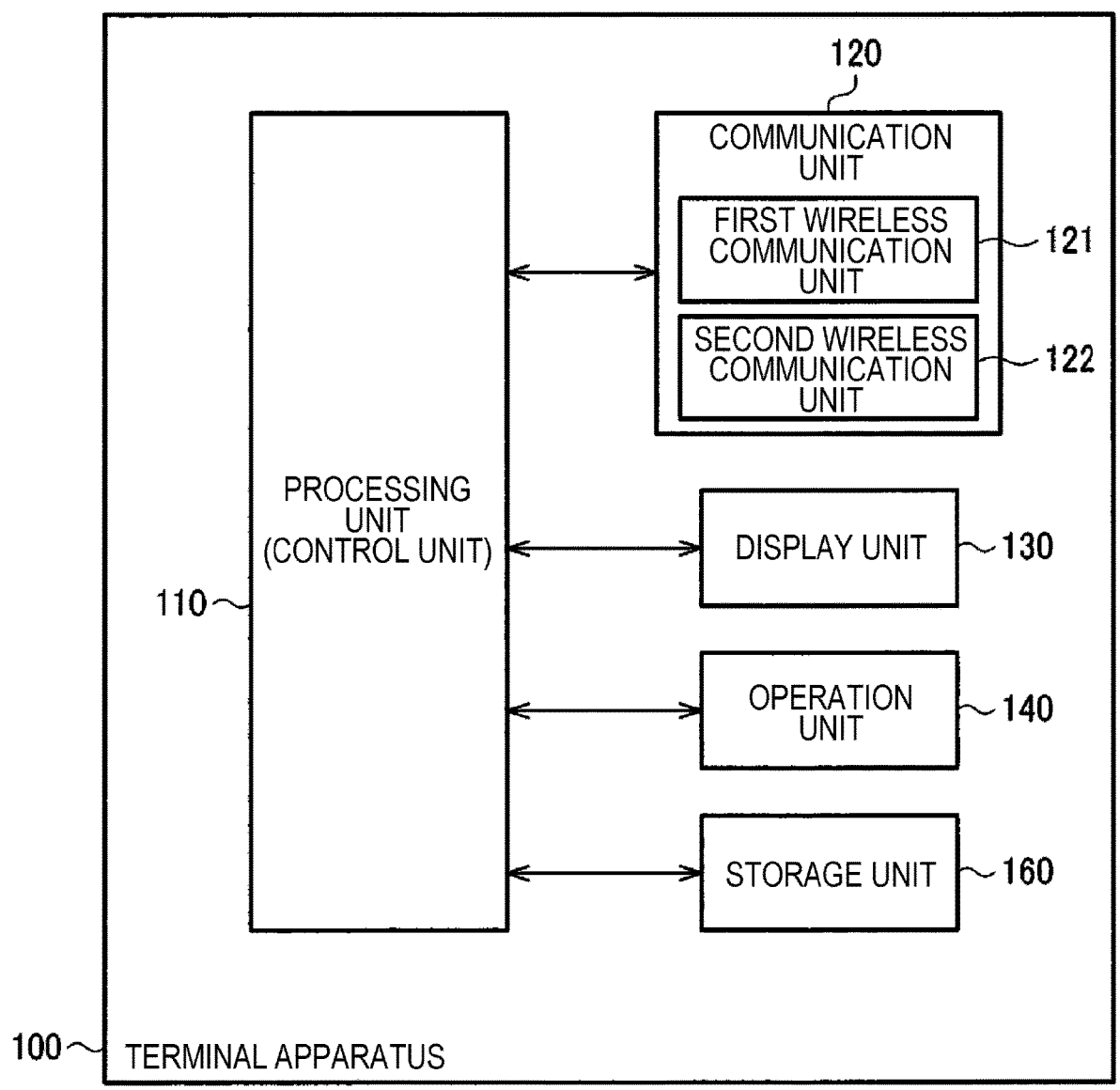
FIG. 2 is a diagram illustrating an example of a configuration of a terminal apparatus.

FIG. 2 is a block diagram illustrating an example of a configuration of the terminal apparatus 100. The terminal apparatus 100 includes a processing unit 110, a communication unit 120, a display unit 130, an operation unit 140, and a storage unit 160. For example, the processing unit 110 is a processor or a controller, the communication unit 120 is a communication interface, the display unit 130 is a display, the operation unit 140 is an operation button or the like, and the storage unit 160 is a storage device or a memory.

The processing unit 110 performs control of each of the communication unit 120, the display unit 130, the operation unit 140, and the storage unit 160.

Each processing operation and each function according to the present embodiment, which is performed by the processing unit 110, can be realized by a processor that includes hardware. For example, each processing operation according to the present embodiment can be realized by a processor that operates based an information such as a program, and a memory in which the program and the information are stored. The processor here, for example, may cause a function of each unit to be realized in individual hardware or may cause the function of each unit to be realized in integrated hardware. For example, the processor can include a piece of hardware, and the piece of hardware can include at least one of a circuit that processes a digital signal and a circuit that processes an analog signal. For example, the processor can be configured with one or multiple circuit devices that are mounted on a circuit substrate, or with one or multiple circuit elements. The circuit device here is an integrated circuit (IC), or the like, and the circuit element is a resistor, a capacitor, or the like. The processor, for example, may be a central processing unit (CPU). However, the processor is not limited to the CPU, and it is possible that various processors such as a graphics processing unit (GPU) and a digital signal processor (DSP) are used. Furthermore, the processor may be a hardware circuit such as an application specific integrated circuit (ASIC). Furthermore, the processor may be configured with multiple CPUs, and may be configured with hardware circuits such as multiple ASICs. Furthermore, the processor may be configured with a combination of multiple CPUs and hardware circuits such as multiple ASICs.

The communication unit 120 includes a first wireless communication unit 121 and a second wireless communication unit 122. The first wireless communication unit 121 is a wireless communication device that performs wireless communication that complies with Wi-Fi standards, and the second wireless communication unit 122 is a wireless communication device that performs wireless communication in compliance with BLE standards. Each wireless communication device, for example, is a wireless communication chip.

The display unit 130 is configured with a display on which various pieces of information are displayed for the user, and the like, and the operation unit 140 is configured with a button on which the user performs an input operation, and the like. It is noted that the display unit 130 and the operation unit 140 may be configured to be integrally combined into a touch panel.

The storage unit 160 (a storage device or a memory) stores various information including a data and a program. The processing unit 110 or the communication unit 120, for example, operates with the storage unit 160 as a working area. The storage unit 160 may be a semiconductor memory, such as a static random access memory (SRAM) or a dynamic random access memory (DRAM), may be a register, be a magnetic memory device such as a hard disk drive (HDD), and may be an optical storage device such as an optical disk.

Figure 3:
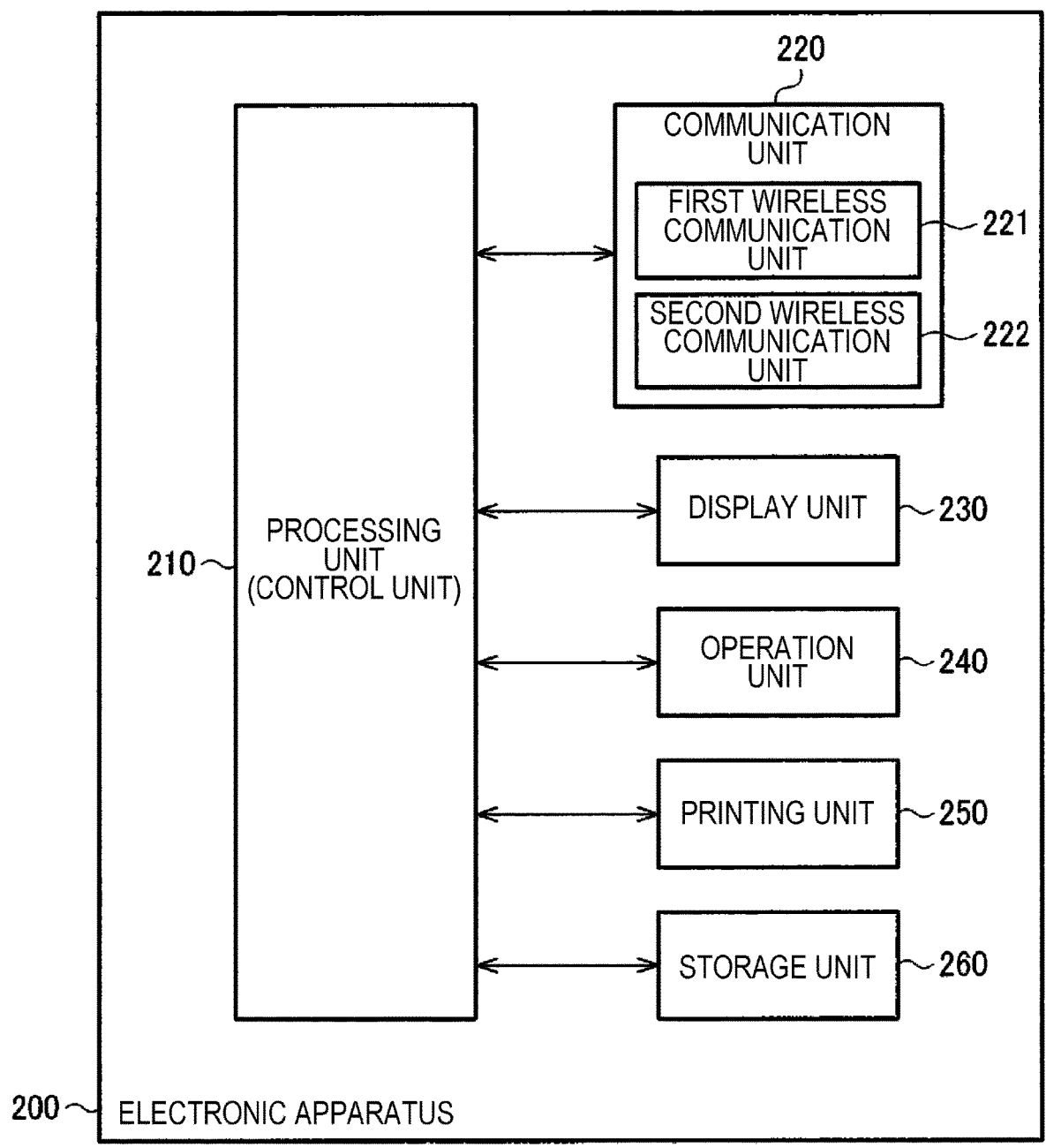
FIG. 3 is a diagram illustrating an example of a configuration of an electronic apparatus.

FIG. 3 is a block diagram illustrating an example of a configuration of the electronic apparatus 200. It is noted that FIG. 3 illustrates the electronic apparatus 200 that has a printing function and that an example where the electronic apparatus 200 is a printer will also be described below. However, as described above, examples of the electronic apparatus 200 further include apparatuses other than the printer. The electronic apparatus 200 includes a processing unit 210, a communication unit 220, a display unit 230, an operation unit 240, a printing unit 250, and a storage unit 260.

The processing unit 210 performs control of each of the units of the electronic apparatus 200. For example, the processing unit 210 can include multiple CPUs, such as a main CPU and a sub-CPU, or a micro-processing unit (MPU). The main CPU performs control of each of the units of the electronic apparatus 200 or overall control of the electronic apparatus 200. The sub-CPU performs various processing operations for printing, for example, in a case where the electronic apparatus 200 is a printer. Alternatively, a CPU for communication processing may be further provided.

The communication unit 220 includes a first wireless communication unit 221 and a second wireless communication unit 222. The first wireless communication unit 221 is a wireless communication device that performs wireless communication that complies with Wi-Fi standards, and the second wireless communication unit 222 is a wireless communication device that performs wireless communication in compliance with BLE standards. The first wireless communication unit 221 activates an internal access point according a given connection setting, and receives a connection request from the terminal apparatus 100. The connection settings are settings of an SSID, a password or a passphrase, a communication frequency band, an encryption scheme, and the like. The setting of the communication frequency band corresponds to a channel setting. Alternatively, the first wireless communication unit 221 makes a Wi-Fi connection to an external access point.

Furthermore, although not illustrated in FIG. 3, the communication unit 220 may include a third communication unit for making a connection to an external access point in a wired-connection manner. The communication unit 220, for example, is configured in such a manner that the first wireless communication unit 221 and the third communication unit are included and that effective or ineffective switching among first to third connection modes is possible. The first connection mode is a connection mode in which the first wireless communication unit 221 makes a wireless connection to the external access point. The second connection mode is a connection mode in which the first wireless communication unit 221 activates the internal access point. The third connection mode is a connection mode in which the third communication unit makes a wired connection to the external access point. Furthermore, a modification implementation in which one of the first wireless communication unit 221 and the third communication unit is omitted is also possible.

The display unit 230 is configured with a display on which various pieces of information are displayed for the user, and the like, and the operation unit 240 is configured with a button on which the user performs an input operation, and the like. It is noted that, for example, the display unit 230 and the operation unit 240 may be configured to be integrally combined into a touch panel.

The printing unit 250 includes a printing engine. The printing engine has a mechanical configuration in which printing of an image is performed on a printing medium. The printing engine, for example, includes a transportation mechanism, an ink jet type discharge head, and a driving mechanism for a carriage including the discharge head, and the like. The printing engine discharges ink from the discharge head onto the printing medium that is transmitted by the transportation mechanism, and thus prints an image on the printing medium. As the printing medium, various media can be used such as a paper sheet and a piece of cloth. It is noted that the specific configuration of the printing engine is not limited to that described here as an example, and may be one in which printing that uses toner is performed using an electrophotographic method.

The storage unit 260 (a storage device or a memory) stores various information including a data and a program. The processing unit 210 or the communication unit 220, for example, operates with the storage unit 260 as a working area. The storage unit 260 may be a semiconductor memory, may be a register, may be a magnetic memory device, and may be an optical storage device.

2. Technique According to the Present Embodiment

Next, a technique according to the present embodiment will be described. First, an outline is described, and thereafter, processing is in detail described.

2.1 Outline

A technique in JP-A-2015-200989 may be possible in which the electronic apparatus 200 at a short distance is specified using BLE or in which display is performed considering a positional relation to the terminal apparatus 100. However, a communication speed is lower in BLE than in Wi-Fi, and with BLE, it is not easy to transmit all pieces of print data. In other words, because the terminal apparatus 100 transmits a large amount of print data at a high speed, it is desirable that a connection to the printer is made with Wi-Fi. Specifically, a print application that runs on an operating system (OS) of the terminal apparatus 100 performs processing that accepts an operation of selecting a printer that is a connection target that uses Wi-Fi, or performs connection processing.

In this respect, in JP-A-2015-200989, Wi-Fi information is not considered when an apparatus that is a printing target is selected or displayed. For this reason, the electronic apparatus 200 that does not receive a BLE signal, although it possibly performs a job with a Wi-Fi connection, is selected and thus is not included in display targets. Furthermore, if a distance that is determined with BLE is short, the electronic apparatus 200 that is unable to perform a job with the Wi-Fi connection is selected and thus is a display target.

Consequently, in the present embodiment, display processing is performed using the Wi-Fi information as well as information that is based on BLE. As will be described below with reference to FIG. 4, in a case where the terminal apparatus 100 and the electronic apparatus 200 are directly connected to each other, a printer that operates as an access point transmits a beacon signal for broadcasting an SSID of its own and the terminal apparatus 100 receives the beacon signal. Thus, a printer that is directly connectable is searched for. The beacon signal that complies with Wi-Fi standards is hereinafter expressed as a Wi-Fi beacon signal. Furthermore, in order to provide a distinction from the Wi-Fi beacon signal, a beacon signal that complies with BLE standards is expressed as a BLE beacon signal. Specifically, the Wi-Fi beacon signal is a signal for broadcasting an SSID, and the BLE beacon signal is an advertisement packet.

In a case where the Wi-Fi beacon signal has been received, the terminal apparatus 100 can determine that it is possible that a connection to the electronic apparatus 200 which transmits the Wi-Fi beacon signal is established. That is, only with the use of a result of the search for the electronic apparatus 200, which uses a Wi-Fi function, there is a high likelihood that a suitable electronic apparatus 200 will be selected as a connection target, compared with a technique in JP-A-2015-200989.

Moreover, in the present embodiment, Wi-Fi radio wave interference is also considered. In recent years, with the widespread use of electronic apparatuses that function as WFD access points, public wireless LAN services, mobile Wi-Fi routers, and the like, the number of cases where many access points are present in the vicinity of the terminal apparatus 100 increases as well. When radio waves that are transmitted from multiple access points interfere with each other, in some cases, this exerts an influence a connection by the terminal apparatus 100. For example, although the electronic apparatus 200, a Wi-Fi connection to which is determined as being possible, is present, in a case where many access points that use the same communication channels are present in the vicinity, there is a concern that communication connection release or a speed reduction due to radio wave interference will occur.

The terminal apparatus 100 according to the present embodiment, as illustrated in FIG. 2 includes the first wireless communication unit 121 that performs wireless communication with the electronic apparatus 200 using the first wireless communication scheme, the second wireless communication unit 122 that performs wireless communication with the electronic apparatus 200 using the second wireless communication scheme that is different from the first wireless communication scheme, and the processing unit 110 that performs communication control of the first wireless communication unit 121 and the second wireless communication unit 122.

Then, the processing unit 110 performs processing that displays on a display unit a display image that is based on information on the degree of radio wave interference in communication with the electronic apparatus 200 in compliance with the first wireless communication scheme and information on a distance to the electronic apparatus 200, which is obtained based on the beacon signal in compliance with the second wireless communication scheme.

At this point, the information on the degree of radio wave interference in the communication with the electronic apparatus 200 is an index indicating to what extent a radio wave that is used in compliance with the first wireless communication scheme by the electronic apparatus 200 interferes with a radio wave that is emitted by any other apparatus. The information on the degree of radio wave interference may indicate whether the degree of radio wave interference is high or low, in a stepwise manner or using numerical values. The high degree of radio wave interference indicates that the radio wave that is used for the communication with the electronic apparatus 200 interferes with another radio wave and thus that there is a likelihood that a problem will occur in the communication with the terminal apparatus 100. Furthermore, the distance information is information indicating a distance between the terminal apparatus 100 and the electronic apparatus 200. Various pieces of information can be used as the distance information, and the distance information will be described.

It is noted that an example in which the processing unit 110 displays a display image on the display unit 130 of the terminal apparatus 100 is described. That is, the processing unit 110 generates the display image based on the information on the degree of radio wave interference in the electronic apparatus 200 and the distance information that is obtained with the BLE beacon signal, and performs processing that displays the generated display image on the display unit 130 of itself own. However, the display unit is not limited to the display unit 130 of the terminal apparatus 100. For example, the processing unit 110 of the terminal apparatus 100 may perform processing that displays the display image on the display unit 230 of the electronic apparatus 200 or a display unit of a different apparatus. The "processing for displaying" in this case is processing that transmits the display image, processing that transmits information which provides an instruction for display, or the like. Furthermore, the "processing for displaying" is processing that transmits information for generating the display image, for example, information that results from association, as will be described below with reference to FIG. 8, and the processing that generates the display image may be performed in an apparatus that has a display unit.

With the use of the information on the degree of radio wave interference, it is possible that the user is presented not only with information simply indicating whether or not a Wi-Fi connection to the electronic apparatus 200 is possible, but also with an index relating to communication quality in a case where the connection to the electronic apparatus 200 is established. Specifically, with the use of the information on the degree of radio wave interference, information as to whether the communication with the electronic apparatus 200 is difficult to release or whether or not it is difficult for a reduction in communication speed to occur can be presented. Moreover, because the distance information is displayed based on BLE, it is also possible that the user is notified whether or not a distance from the terminal apparatus 100 is short, in other words, whether or not printed matters are easy to collect. That is, with the technique according to the present embodiment, in the terminal apparatus 100 that uses multiple different wireless communication schemes, the display image in a greatly convenient mode that compositely uses information in compliance with the multiple wireless communication schemes can be displayed.

It is noted, as described above, the first wireless communication unit 121 establishes a connection to the electronic apparatus 200 using the first wireless communication scheme and that the processing unit 110 performs processing which transmits processing-target data to the electronic apparatus 200 that establishes the connection or processing which receives processing-target from the electronic apparatus 200 that establishes the connection.

The processing that transmits the processing-target data is processing that transmits print data to the electronic apparatus 200 that is a printer, or the like. The processing that receives the processing-target data is processing that receives scan data from the electronic apparatus 200 that is a printer, or the like. In other words, in a case where the processing-target data is data that is used for the electronic apparatus 200 to perform a job, the processing-target data is transmitted from the terminal apparatus 100 to the electronic apparatus 200. On the other hand, in a case where the processing-target data is data that is generated by the electronic apparatus 200 performing a job, the processing-target data is transmitted by the electronic apparatus 200 and is received by the terminal apparatus 100. In this manner, in the present embodiment, the transmission and reception of the processing-target data are performed using the first wireless communication scheme in which a communication speed is relatively high, and the second wireless communication scheme is supplementally used to smoothly transmission and reception of data.

2.2 Detailed Processing 2.2.1 Specific Example of the System

Figure 4:
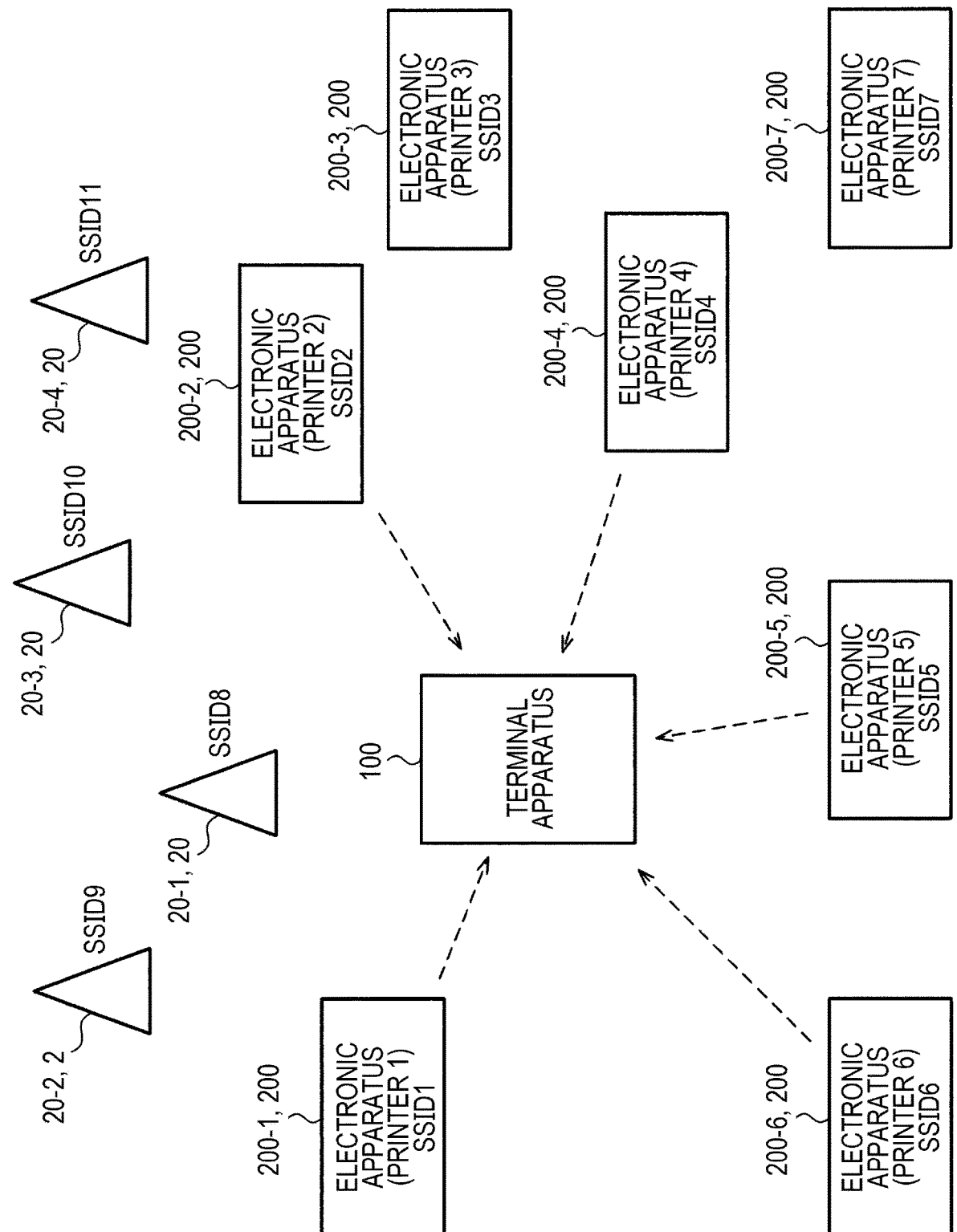
FIG. 4 is a diagram illustrating a specific example of a communication system according to the present embodiment.

FIG. 4 illustrates a specific example of a system according to the present embodiment. Multiple electronic apparatuses 200, which are illustrated in FIG. 4, each function as access points. In FIG. 4, as the multiple electronic apparatuses 200, seven electronic apparatuses, that is, electronic apparatuses 200-1 to 200-7 are illustrated. The electronic apparatuses 200-1 to 200-7 are hereinafter expressed as a printer 1 to a printer 7. Furthermore, multiple external access points 20 (20-1 to 20-4) are present in the vicinity of the terminal apparatus 100. It is possible that the terminal apparatus 100 receives Wi-Fi beacon signals from the electronic apparatus 200-1 to 200-7 and Wi-Fi beacon signals from the external access points 20-1 to 20-4.

Furthermore, the electronic apparatus 200 according to the present embodiment transmits an advertisement packet that is beacon signal that complies with the second wireless communication scheme, that is, a BLE beacon signal. In FIG. 4, an example is illustrated in which the second wireless communication unit 122 of the terminal apparatus 100 can receive BLE beacon signals of the printer 1, the printer 2, and the printers 4 to printers 6 that are at a nearby location, but cannot receive BLE beacon signals of the printer 3 and the printer 7 that are at a distant location.

2.2.2 Acquisition of Information with the Wi-Fi Beacon Signal

In the present embodiment, the first wireless communication unit 121 of the terminal apparatus 100 receives the Wi-Fi beacon signal using the first wireless communication scheme. The Wi-Fi beacon signal includes a basic service set identifier (BSSID) of, an SSID of, and channel information on, an apparatus that is a transmission source. It is noted that, although a description is omitted below, it is possible that the Wi-Fi beacon signal includes any other pieces of information, such as a beacon transmission interval, transfer speed information, and security information.

The SSID is information for identifying an access point. Referring to the SSID, the terminal apparatus 100 can determine whether or not the apparatus that transmits the Wi-Fi beacon signal is an apparatus that is a target to which the terminal apparatus 100 itself makes a connection. For example, SSID 1 to SSID 7 that are SSIDs of the printer 1 to the printer 7 are set as a string of characters that are generated according to specific command rules. An algorithm for determining whether or not the acquired SSID is generated according to the command rule is included in the print application of the terminal apparatus 100, and with the algorithm, it is determined that an apparatus of which an SSID is consistent with the command rule is a printer that is a candidate for a connection target. In an example in FIG. 4, the terminal apparatus 100 acquires 11 SSIDs, that is, SSID 1 to SSID 11, and determines that SSID 1 to SSID 7 are SSIDs of printers and that SSID 8 to SSID 11 are SSIDs of access points other than the printer.

The BSSID is specifically a MAC address of an apparatus that is a transmission source. The terminal apparatus 100 sets a MAC address, which is included in the Wi-Fi beacon signal which is transmitted from the electronic apparatus 200, to be a first identification information on the electronic apparatus 200.

The channel information is information indicating communication channel that is used for Wi-Fi communication. In a case where a 2.4 GHz band is used for communication, 1 ch to 13 ch are available with IEEE 802.11b, and 1 ch to 14 ch are available with IEEE 802.11g. Consequently, the channel information is information specifying one channel of 1 ch to 13 ch or 1 ch to 14 ch. Even in a case where a 5 GHz is used for communication, multiple available channels, that is, 36 ch, 40 ch, 44 ch, and 48 ch, are set in advance, and the channel information is information specifying one channel of the multiple channels.

Furthermore, in addition to the information described above, the processing unit 110 of the terminal apparatus 100 can acquire radio wave strength information that results when the Wi-Fi beacon signal is received. For example, the processing unit 110 of the terminal apparatus 100 acquires the radio wave strength information using a function of an OS of the terminal apparatus 100. In other words, the radio wave strength information may be a reception radio wave strength or a reception signal strength.

As described above, by receiving the Wi-Fi beacon signal, the terminal apparatus 100 can acquire a communication frequency that is used by the access point for communication, and radio wave strength information on a radio wave from the access point, in a state of being associated with an SSID of a neighboring access point.

Figure 5:
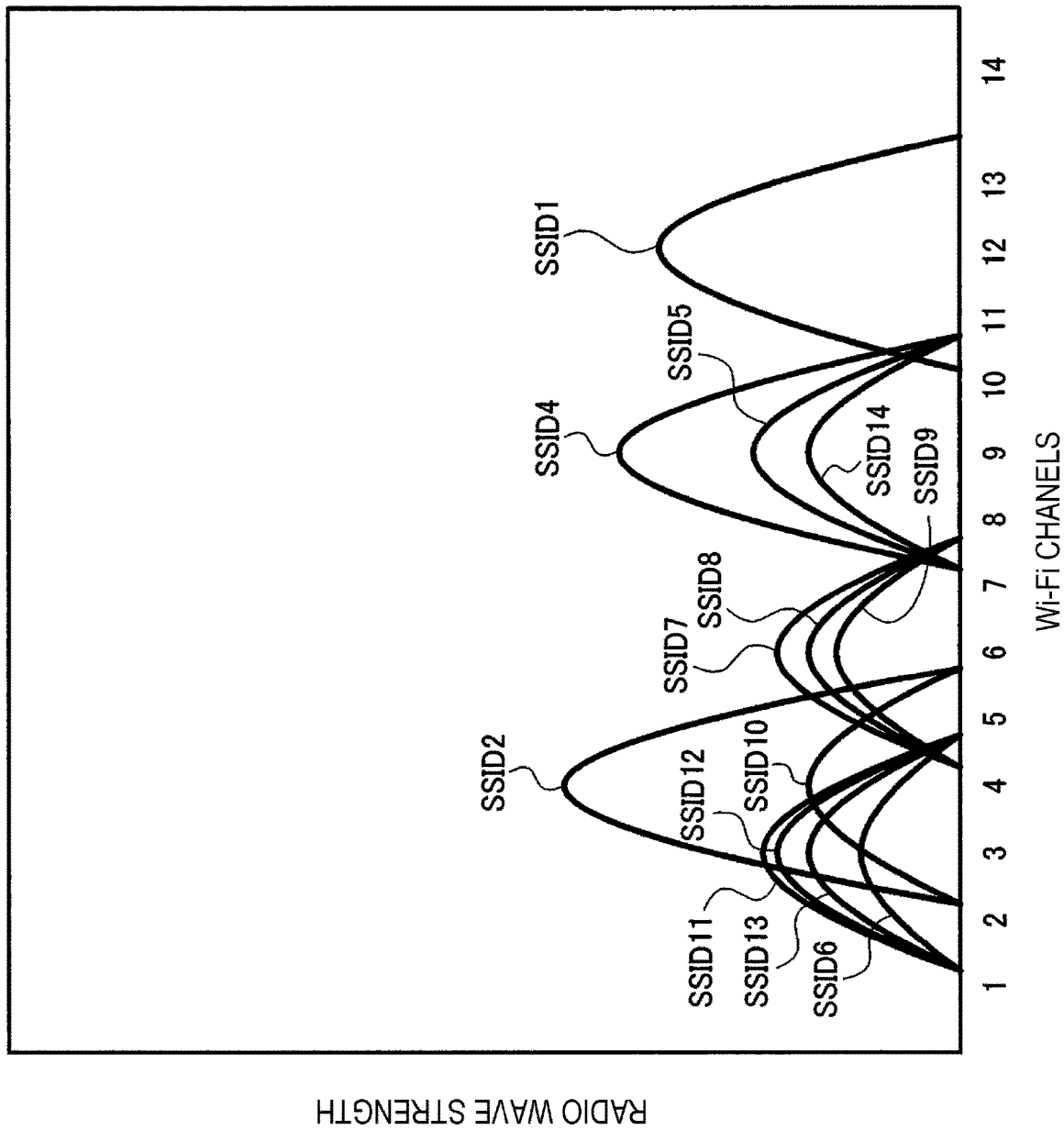
FIG. 5 is a diagram illustrating an example of a Wi-Fi radio wave situation.

FIG. 5 illustrates a specific example of a Wi-Fi radio wave situation. In FIG. 5, the horizontal axis represents a channel, and the vertical axis represents a radio wave strength. It is noted that FIG. 5 illustrates an example in which an apparatus that is not illustrated in FIG. 4 is also included and in which radio waves from 14 access points are detectable with 2.4 GHz. For this reason, a radio wave for a certain access point is influenced not only by a channel that is set, but also by a channel in an adjacent frequency band. For this reason, a radio wave from each access point is expressed as a curved line in the shape of a bow on a graph in FIG. 5. It is noted that an example of 2.4 GHz band will be described below, but that the same processing is performed in the case of 5 GHz band.

The processing unit 110 obtains the information on the degree of radio wave interference based on the degree of overlap of communication frequency bands that are used for the wireless communication in compliance with the first wireless communication scheme, and on a radio wave strength of a radio wave that is used for the wireless communication in compliance with the first wireless communication scheme.

In a case where the communication frequency bands overlap, in some cases, multiple packets are transmitted at the same time in adjacent frequency bands. In a case where the packet receiving side that undergoes packet collision does not reply with an acknowledgement (ACK), retransmission of a packet is performed and thus a communication decreases. Furthermore, in a case where a radio wave strength is low, there is a concern that packet loss will occur easily and the reduction in communication or the releasing of the communication connection will occur. Consequently, because the less the communication frequency bands overlap, the less influence the radio wave interference has, the processing unit 110 determines that the degree of radio wave interference is low. Furthermore, because the higher the radio wave strength, the less influence the radio wave interference has, it is determined that the degree of radio wave interference is low.

A specific detail of the determination of the degree of overlap is considered in various ways. For example, the processing unit 110 may set the number of access points that use the same channel, to be an index value of the degree of overlap. In this case, the higher the index value, the higher the degree of overlap and the degree of radio wave interference.

In the case of SSID 1 in FIG. 5, a channel for the terminal apparatus 100 itself is 12 ch and an other access point that uses 12 ch is not detected. Consequently, the processing unit 110 determines that the degree of overlap for the printer 1 which corresponds to SSID 1 is "0". In the same manner, SSID 2 uses 4 ch and an access point that corresponds to SSID 10 uses 4 ch for any other apparatus. Consequently, the processing unit 110 determines that the degree of overlap for the printer 2 which corresponds to SSID 2 is "1".

As will be described below, the processing unit 110 determines the degree of overlap for each electronic apparatus 200, by counting the number of any other access points that uses the same channel.

However, as illustrated in FIG. 5, a radio wave for an access point is influenced not only by a channel that is set, but also by a channel in an adjacent frequency band. A radio wave for SSID 6 is on 3 ch and a radio wave for SSID 2 is on 4 ch. However, it is considered that the radio wave for SSID 2 also has a sufficient radio wave strength in a frequency band for 3 ch and that a radio wave for SSID 6 is influenced by the radio wave for SSID 2. Consequently, the processing unit 110 may set the number of access points that use the same channel and the number of access points that use adjacent channels, to be the index value of the degree of overlap.

In the case of SSID 1 in FIG. 5, because a channel for the terminal apparatus 100 itself is 12 ch, the number of access points that use 11 ch to 13 ch is set to be the index value of the degree of overlap. Because SSID 2 uses 4 ch, the number of access points that use 3 ch to 5 ch is set to be the index value of the degree of overlap. The channel, based on which the degree of overlap is determined is not limited to adjacent channels, and it is also possible that a range of channels is broadened.

Furthermore, the processing unit 110 may obtain the index value of the degree of overlap, not only by simply counting the number of access points that use overlapping channels, but also by performs weighting. For example, when obtaining the degree of overlap for a given access point, a channel that is used by the access point receives relatively more weighting, and an adjacent channel receive relatively less weighting. In the case of the example of SSID 2 described above, the number of any other access points that use the same 4 ch is 1, that is, one SSID that is SSID 10 is present. The number of any other access points that use adjacent 3 ch or 5 ch is 4. In this case, the index value of the degree of overlap is set to be 1×w1+4×w2 instead of being set to be 1+4=5. At this point, w1 and w2 are arbitrary weighting coefficients that satisfy w1>w2.

However, in a case where the radio wave strength is excessively low, although the degree of overlap is low, there is a high likelihood that the packet loss will occur and the reduction in communication speed or the releasing of the communication connection easily occurs. Consequently, the processing unit 110 determines whether or not the radio wave strength is less than a given threshold Th1. In a case where the radio wave strength is less than Th1, it is determined that a radio wave from the access point is influenced by interference in a considerably easy manner, that is, that the degree of radio wave interference is highest. Specifically, the processing unit 110 performs processing compares the radio wave strength and the threshold Th1, before determining the degree of overlap, and in a case where the radio wave strength is less than the given threshold Th1, skips the determination of the degree of overlap.

Furthermore, even in a case where it is determined that the degrees of overlap of frequency bands of a given radio wave and any other radio wave is approximately the same, the degrees of interference in the two radio waves are not limited to being approximately the same. In an example in FIG. 5, any one of the printer 4 that corresponds to SSID 4 and the printer 5 that corresponds to SSID 5 uses 9 ch and thus it is determined that the degree of overlap is "2". However, a radio wave of the printer 4 has a higher radio wave strength than a radio wave of the printer 5. Consequently, it is relatively difficult for the packet loss to in the printer 4, and it is difficult for a reduction in speed or the like to occur. More precisely, it has to be determined that the printer 4 has the lower degree of radio wave interference than the printer 5. Furthermore, in the example in FIG. 5, because the degree of overlap of the printer 7 that corresponds to SSID 7 is also "2", but because the radio wave strength is lower than that of the printer 4, it has to be determined that the printer 4 has the lower degree of radio wave interference than the printer 7.

Consequently, in a case where the degrees of overlap are approximately the same, the processing unit 110 performs processing that obtains the information on the degree of radio wave interference, in such a manner that the higher the radio wave strength, the lower the degree of radio wave interference and that the lower the radio wave strength, the higher the degree of radio wave interference. At this point, in order to determine whether the radio wave strength is high or low, a relative comparison between radio wave strengths of the two access points may be made such as a comparison between a radio wave strength of SSID 4 and a radio wave strength SSID 5 in FIG. 5. Alternatively, a given threshold Th2 (>Th1) is set, and it may be determined whether or not the radio wave strength is at or above the Th2.

For example, the processing unit 110 obtains the information on the degree of radio wave interference at four stages according to determination that will be described below. (1) is the lowest degree of radio wave interference, (2) is the second lowest degree of radio wave interference, (3) the third lowest degree of radio wave interference, and (4) is the highest degree of radio wave interference. An overlap threshold is a threshold for determining whether the degree of overlap is high or low.

(1) The index value of the degree of overlap is at or above the overlap threshold and the radio wave strength is at or above the Th2

(2) The index value of the degree of overlap is at or below the overlap threshold and the radio wave strength is at or above the Th1 and below the Th2

(3) The index value of the degree of overlap is above the overlap threshold and the radio wave strength is at or above the Th1

(4) The radio wave strength is below the Th1

However, the above is an example of processing that obtains the information on degree of radio wave interference, and it can be apparent to a person of ordinary in the art that various modifications are possible. For example, it is possible that the processing unit 110 sets a given evaluation function whose arguments are the degree of radio wave interference and the radio wave strength, and the information on the degree of radio wave interference is calculated based on an output of the evaluation function.

Figure 6:
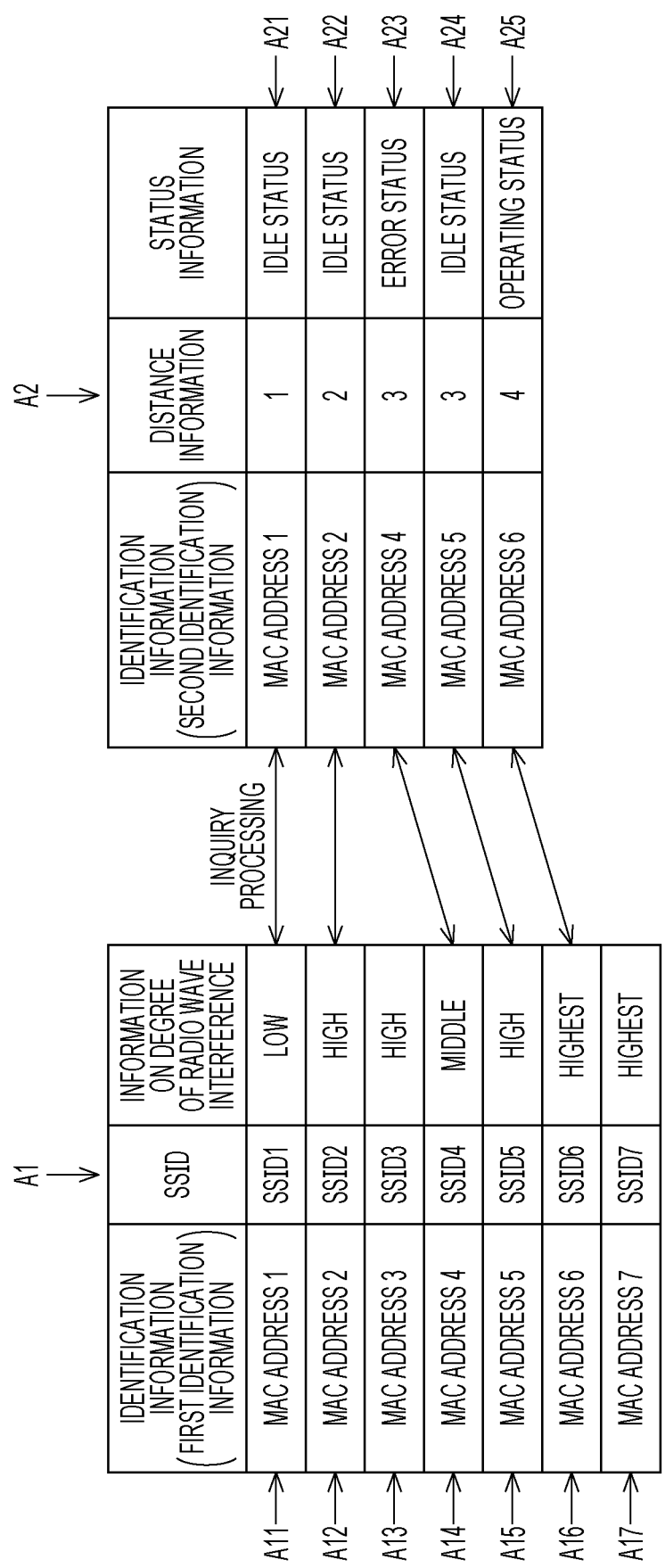
FIG. 6 is a diagram illustrating examples of information that is acquired with Wi-Fi and information that is acquired with BLE.

A1 of FIG. 6 is an example of data that is acquired by the processing unit 110 based on the Wi-Fi beacon signal. As illustrated in A1, based on the Wi-Fi beacon signal, the processing unit 110 acquires information that results from associating the SSID and the information on the degree of radio wave interference with the first identification information on the electronic apparatus 200.

2.2.3 Acquisition of the Information with the BLE Beacon Signal

Furthermore, the second wireless communication unit 122 receives the BLE beacon signal from the electronic apparatus 200. FIG. 7 illustrates an example of a data structure of the BLE beacon signal.

The BLE beacon signal is available for various uses, and in some cases, multiple types of BLE beacon signals are also transmitted and received between the terminal apparatus 100 and the electronic apparatus 200. A beacon identifier is information that specifies for which use the BLE beacon signal is used. The beacon identifier in FIG. 7 is information which indicates that the BLE beacon signal is a beacon for generating the display image, and is information that is different from a beacon identifier of a beacon that is used for any other use.

Pieces of identification information on the electronic apparatuses 200 (second identification information) are pieces of information by which the electronic apparatuses 200 are identifiable from each other. The second identification information is the MAC address of the electronic apparatus 200, but as the second identification information, any other information may be used. However, as the second identification information, information in the same format as the first identification information, or information that is possibly replaced with the first information is used. In a case where the first wireless communication unit 121 acquires a MAC address as the first identification information, a MAC address itself or information which is possibly converted into the MAC address and into which the MAC address is possibly converted, is used as the second identification information that is included in the BLE beacon signal.

Status information is information that indicates a status of the electronic apparatus 200. The status information in a narrow sense is information that specifies whether an operating status of the electronic apparatus 200 is an idle status or an error status. The operation status is a state where the electronic apparatus 200 performs a job, such as printing, using a function of its own. A behavior in a case where a new job is input in the operating status is determined by a setting of the electronic apparatus 200, but for example, after a job that is currently being performed is completed, proceeding to perform the job that is newly input takes place. The idle status is a state where the electronic apparatus 200 waits for job inputting, without performing a job. The error status is a state where any error occurs, a status where a job cannot be performed, or a status where a problem occurs while a job is performed. In the case of a printer, the error status is a state where ink or toner is used up, a printing medium, such as a paper sheet, is used up, a printing medium is jammed up, a component failure occurs, or the like.

In other words, it is considered that the operating status is a status where a new job cannot be immediately performed, that the idle status is a status where a new job is possibly immediately performed, and that the error status is a status where there is a need for the user to take a corrective action to perform a job.

Furthermore, in addition to information that is illustrated in FIG. 7, the processing unit 110 of the terminal apparatus 100 can acquire the distance information that is based on the radio wave strength that results when the BLE beacon signal is received. The higher the radio wave strength, the shorter the distance that is indicated by the distance information, and the lower the radio wave strength, the longer the distance that is indicated by the distance information. The distance information may be expressed at multiple stages. In the following description, the distance information is evaluated at four stages from 1 to 4, 1 is the shortest distance, and 4 is the longest distance. However, as will be described below as a modification example, it is possible that processing which calculates a distance is performed based on the radio wave strength information. In a case where the arithmetic operation processing is performed, the distance can be expressed in the unit meter or the like, and it is possible that the distance is obtained with the high precision compared with a case where the arithmetic operation processing is not performed.

A2 of FIG. 6 is an example of information that is acquired with the BLE beacon signal. As illustrated in A2, the terminal apparatus 100 acquires information that results from associating the distance information and the status information with the identification information on the electronic apparatus 200.

2.2.4 Collation Processing and Display Processing

As illustrated in A1 and A2 of FIG. 6, the first wireless communication unit 121 acquires the first identification information on the electronic apparatus 200 using the first wireless communication scheme, and the second wireless communication unit 122 acquires the second identification information on the electronic apparatus 200 using the second wireless communication scheme. In an example in FIG. 4, the first identification information is included in the Wi-Fi beacon signal, and the second identification information is included in the BLE beacon signal. Based on the processing that collates the first identification information and the second identification information, the processing unit 110 generates the display image in a state of being associated with the information on the degree of radio wave interference and the distance information.

In an example in FIG. 6, it is determined that a MAC address in A11 and a MAC address in A21 are the same as a "MAC address 1". That is, it is understood that the distance information "1" and the status information "idle status", which are illustrated in A21, are pieces of information relating to the printer 1 in A1. In the same manner, it can be determined that each of A12 and A22, A14 and A23, A15 and A24, and A16 and A25 are pieces of information relating to the same electronic apparatus 200. On the other hand, it is determined that an electronic apparatus 200 which is illustrated in each of A13 and A11 do not receive the BLE beacon signal, and the distance information and the status information are not associated with the electronic apparatus 200.

FIG. 8 illustrates information that is obtained from A1 and A2 in FIG. 6. In this manner, by performing the processing that collates the first identification information and the second identification information, it is possible that the information which is acquired with Wi-Fi and the information which is acquired with BLE are suitably associated with each other. Specifically, information that results from associating the SSID, the information on the degree of radio wave interference, the distance information, and the status information with the identification information on the electronic apparatus 200 is acquired.

The first wireless communication unit 121 searches for the electronic apparatus 200 that is available for communication, through the wireless communication in compliance with the first wireless communication scheme. Then, the processing unit 110 displays list-displays multiple electronic apparatuses 200 and performs processing that displays on the display unit the display image in the display mode, which results from associating an object that indicates the information on the degree of radio wave interference and the distance information in an identifiable manner, with each of the list-displayed multiple electronic apparatuses 200.

Furthermore, as illustrated in A2 of FIG. 6, based on the beacon signal, the second wireless communication unit 122 acquires the status information on the electronic apparatus 200 that transmits the beacon signal. Then, the processing unit 110 may perform processing that displays on the display unit the display image in the display mode, which results from associating a second object that indicates the status information in an identifiable manner, with each of the list-played multiple electronic apparatuses 200. An example will be described below in which the display image is displayed that results from associating an object that indicates the information on the degree of radio wave interference, the distance information and the status information in an identifiable manner, with the electronic apparatus 200.

FIG. 9 illustrated an example of the display image according to the present embodiment. The processing unit 110 performs processing that displays a display image in the display mode, on which a plurality of electronic apparatuses 200, which are found as a result of the search that uses the first wireless communication scheme, are list-played. In an example in FIG. 9, seven electronic apparatuses 200 (a printer 1 to a printer 7) that are illustrated in FIG. 4 are listed up in the order that they are found as a result of the search. If this is done, it is possible that the electronic apparatus 200 that is connectable with Wi-Fi is displayed in a high perspicuity mode. At this time, the information on the degree of radio wave interference is additionally displayed, and the information that is acquired with the BLE beacon signal is additionally displayed for the electronic apparatus 200 that has received the BLE beacon signal.

The display image in FIG. 9 includes a list display (hereinafter expressed as a list PL) of the electronic apparatus 200 that is found as a result of the search. Then, an object OB1 (an OB11 to an OB17) in the shape of a circle is displayed, to the left of a name of each electronic apparatus 200 that is included in the list PL, on the display image. The lower the degree of radio wave interference that is indicated by the information on the degree of radio wave interference, the larger the size of the object OB1 that is displayed as an object. Furthermore, the shorter the distance that is indicated by the distance information, the deeper the color of the inside of the object OB1 that is expressed as an object. In a case where the object OB1 is a white-colored circle (OB13 and OB16), this indicates that the BLE beacon signal from the electronic apparatus 200 cannot be received. That is, the object OB1 is an object which indicates the information on the degree of radio wave interference with the size of the object itself in an identifiable manner and that the distance information with the shade of color of the object itself in an identifiable manner. However, the object that sets the information on the degree of radio wave interference to be identifiable, and the object that indicates the distance information in an identifiable manner are not limited to being integrated into one piece, and may be expressed as different two objects. Alternatively, by changing a font or color of text that is included in the list PL, the information on the degree of radio wave interference or the distance information may be indicated in an identifiable manner.

The object OB1 is associated with each of the electronic apparatus 200 (the printer 1 to the printer 7) that are found as a result of the search that uses Wi-Fi, and thus it is possible that the user increases the communication quality that results when the connection is established and suitably selects the electronic apparatus 200 that is at a short distance from the terminal apparatus 100. In the example in FIG. 9, because the greater the size of the object OB1, the deeper the color of the inside of SSID 1 that is displayed, communication in which the degree of radio wave interference is slightly stabilized is possible, and it can be determined that the electronic apparatus 200 is at a short distance from the terminal apparatus 100.

Furthermore, in FIG. 9, an object OB2 (an OB21 to an OB25) in the shape of a circle is displayed to the right of the electronic apparatus 200. The object OB2 is an object of which an internal color or density changes according to the status information on the corresponding electronic apparatus 200. In the example in FIG. 9, the OB21, the OB22, and the OB24 are the same mode, and the OB21, the OB23, and the OB25 are different modes. For example, the OB21, the OB22 and the OB24 indicate that the electronic apparatus 200 is in an idle status, the OB25 indicates that the electronic apparatus 200 is in an operation status, and the OB23 indicates that the electronic apparatus 200 is in an error status. The object OB2 is set not to be displayed for the electronic apparatus 200 from which the BLE beacon signal is not received. The object OB2 corresponds to the second object indicates the status information in an identifiable manner.

The object OB2 is displayed (or is set not to be displayed) in a state of being associated with the electronic apparatuses 200 that is found as a result of the search that uses Wi-Fi, and thus it is possible that the user is caused to recognize a status of each electronic apparatus 200, a Wi-Fi connection to which is possible. For example, the user can be caused to select the electronic apparatus 200 that possibly performs printing immediately. By using both the object OB1 and the OB2, it is also possible that a printer that has high communication quality, is in the vicinity of the terminal apparatus 100, and possibly performs printing immediately is caused to be selected. In the example in FIG. 9, SSID 1 is displayed such that the size of the object OB1 is large and the color of the inside of the object OB1 is deep, and the object OB2 indicates that the object OB2 is in the idle status. Because of this, it is possible that the user is caused to understand that the electronic apparatus 200 is suitable for performing the job.

In the related art, the terminal apparatus 100 establishes a Wi-Fi connection to a printer, and then acquires information on the printer. For this reason, in some case, it is understood that, after the printer selection, the printer is in a state where print cannot be performed and there occurs a need to reselect the printer. In this respect, in the present embodiment, because the status information can be displayed in an identifiable manner in a state that is attained before establishing the connection, it is possible that the number of times that a printer is selected or an attempt is made to make a connection is reduced.

It is noted that in FIG. 9, an example is illustrated in which the order of the list display is the order in which the electronic are found as a result of the search, but various modification implementations of the display mode of the display image are possible. For example, sorting may be performed for the order of listing based on the information on the degree of radio wave interference. In this case, the electronic apparatus 200 is list-displayed in the order in which the electronic apparatuses 200 are suitable as connection targets, that is, in the order of increasing the determined degree of radio wave interference. Alternatively, not only pieces of information on the degree of radio wave interference, but also pieces of distance information are composited, and thus the order of the list display may be determined.

2.2.5 Flow for Processing

FIG. 10 is a flowchart for describing processing that is performed in the processing unit 110 of the terminal apparatus 100. When the processing is started, the processing unit 110 sets BLE and Wi-Fi to be in an activated state (S101). Processing in S101 is equivalent to a state where the first wireless communication unit 121 and the second wireless communication unit 122 are powered off. The processing unit 110 performs processing (S102 and S103) relating to Wi-Fi, and processing (S104 and S105) relating to BLE concurrently.

The processing unit 110 performs processing that searches for an access point using the first wireless communication unit 121 (S102). Specifically, processing is performed that receives the Wi-Fi beacon signal from the electronic apparatus 200 and the external access point 20. Furthermore, in S102, based on the SSID or the like of the received Wi-Fi beacon signal, processing may be performed that specifies the electronic apparatus 200 that is a connection target.

Next, based on the channel information that is included in the Wi-Fi beacon signal and on the reception radio wave strength of the Wi-Fi beacon signal, the processing unit 110 performs processing that obtains the information on the degree of radio wave interference (S103). Specifically, as described above with reference to FIG. 5, based on the degree of overlap of the communication frequency bands and on the radio wave strength, the processing unit 110 obtains the information on the degree of radio wave interference.

Furthermore, the processing unit 110 performs the processing relating to BLE, concurrently with Wi-Fi processing. Specifically, first, with the second wireless communication unit 122, the BLE beacon signal is received from the electronic apparatus 200 (S104). Next, based on the reception radio wave strength of the BLE beacon signal, the processing unit 110 obtains the distance information (S105).

With the processing each of S102 to S105, a search for the electronic apparatus 200 in compliance with Wi-Fi is made, and a state where the information on the degree of radio wave interference and the distance information are obtained is attained. Accordingly, the processing unit 110 performs the collation processing that is based on the first identification information and the second identification information (S106), and performs processing that displays the display image, which results from associating the information on the degree of radio wave interference and the distance information with each electronic apparatus 200 (S107). It is noted that the processing unit 110 repeats the processing that is illustrated in FIG. 10, and thus may update the display image at any time.

FIG. 11 is a flowchart for describing the processing that obtains the information on the degree of radio wave interference which is illustrated in S103. The processing unit 110 determines whether or not the radio wave strength of the Wi-Fi beacon signal from the electronic apparatus 200 that is a target is below the threshold Th1 (S201). In a case where the radio wave strength is below the Th1 (Yes in S201), the processing unit 110 determines that the degree of radio wave interference is highest (S202).

In a case where the radio wave strength is at or above the Th1 (No in S202), the processing unit 110 determines the degree of overlap of the communication frequency bands (S203). As specifically described above, the index value of the degree of overlap is calculated based on the number of access points that use the channel or adjacent channels. Next, the processing unit 110 makes a determination of the radio wave strength (S204). Specifically, a relative comparison among multiple radio wave strengths or a comparison with the threshold Th2 is made.

With the determination in each of S203 and S204, the processing unit 110 determines the degree of radio wave interference. In the example described above, if the index value of the degree of radio wave interference is higher than the overlap threshold in S203, it is determined that the degree of radio wave interference is "high". If the index value of the degree of overlap is at or below the overlap threshold in S203, a comparison between the radio wave strength and the Th2 is made in S204. If the radio wave strength is below the Th2, it is determined that the degree of radio wave interference is "middle. If the radio wave strength is at or above the Th2, it is determined that the degree of radio wave interference is "low".

3. Modification Example

Several modification examples will be described below.

3.1 Modification Example of the Information on the Degree of Radio Wave Interference The example is described above in which the information on the degree of radio wave interference is obtained based on the degree of overlap of the communication frequency bands and on the radio wave strength. However, when the information on the degree of radio wave interference is obtained, any other information may be used.

The first wireless communication unit 121 performs communication in a 2.4 GHz band that complies with Wi-Fi standards, or communication in a 5 GHz band. In this case, communication characteristics in the 2.4 GHz and the 5 GHz are different from each other.

A radio wave in the 2.4 GHz is used for BLE, as well as for Wi-FI, and is widely used for wireless communication or the like with household electrical appliances. On the other hand, the number of apparatuses that are used in the 5 GHz is smaller than that of apparatuses that are used in 2.4 GHz. For this reason, although the degrees of radio wave interference that are obtained from the Wi-Fi beacon signal are approximately the same, there is a likelihood that a difference will occur in interference with a radio wave other than Wi-Fi, and in this respect, the 5 GHz band has an advantage over the 2.4 GHz.

However, in terms of characteristics, in the 2.4 GHz, it is difficult for an obstacle to exert an influence and thus it is easy for a radio wave to travel over a long distance, and on the other hand, in the 5 GHz, it is easy for the obstacle to exert an influence and it is difficult for the radio wave to travel over a long distance. More precisely, in the case of a long distance, the 2.4 GHz band has an advantage over the 5 GHz.

Considering these characteristics, the processing unit 110 according to the present modification example obtains the information on the degree of radio wave interference, based on the degree of overlap of the communication frequency bands, the radio wave strength, and which of the 2.4 GHz and the 5 GHz is used to perform wireless communication.

Specifically, in a case where it is determined that a distance that is indicated by the distance information is at or below a given threshold, the processing unit 110 obtains the information on the degree of radio wave interference, in such a manner that the degree of radio wave interference in a case where the wireless communication in compliance with the first wireless communication scheme is in the 5 GHz band is lower than the degree of radio wave interference in a case where the wireless communication in compliance with the first wireless communication scheme is in the 2.4 GHz band. In other words, in a situation where a distance between the terminal apparatus 100 and the electronic apparatus 200 is short and where there is a high likelihood that an obstacle will not be present such as one that has an influence on communication, the 5 GHz takes precedence. On the other hand, in a situation where the distance between the terminal apparatus 100 and the electronic apparatus 200 is long and where there is a likelihood that an obstacle will be present such as one that has an influence on communication, the 5 GHz does not take place. In the case where the distance between the terminal apparatus 100 and the electronic apparatus 200 is long, the 2.4 GHz band and the 5 GHz band may be equally handled and the 2.4 GHz band may take precedence.

In the present modification example, when obtaining the information on the degree of radio wave interference, the distance information is needed. Consequently, as illustrated in FIG. 11, the processing (S102 and S103) on the Wi-Fi side and processing (S104 and S105) on the BLE side cannot be performed completely in parallel, and the processing in S103 needs to be performed after the processing in S105.

Figure 12:
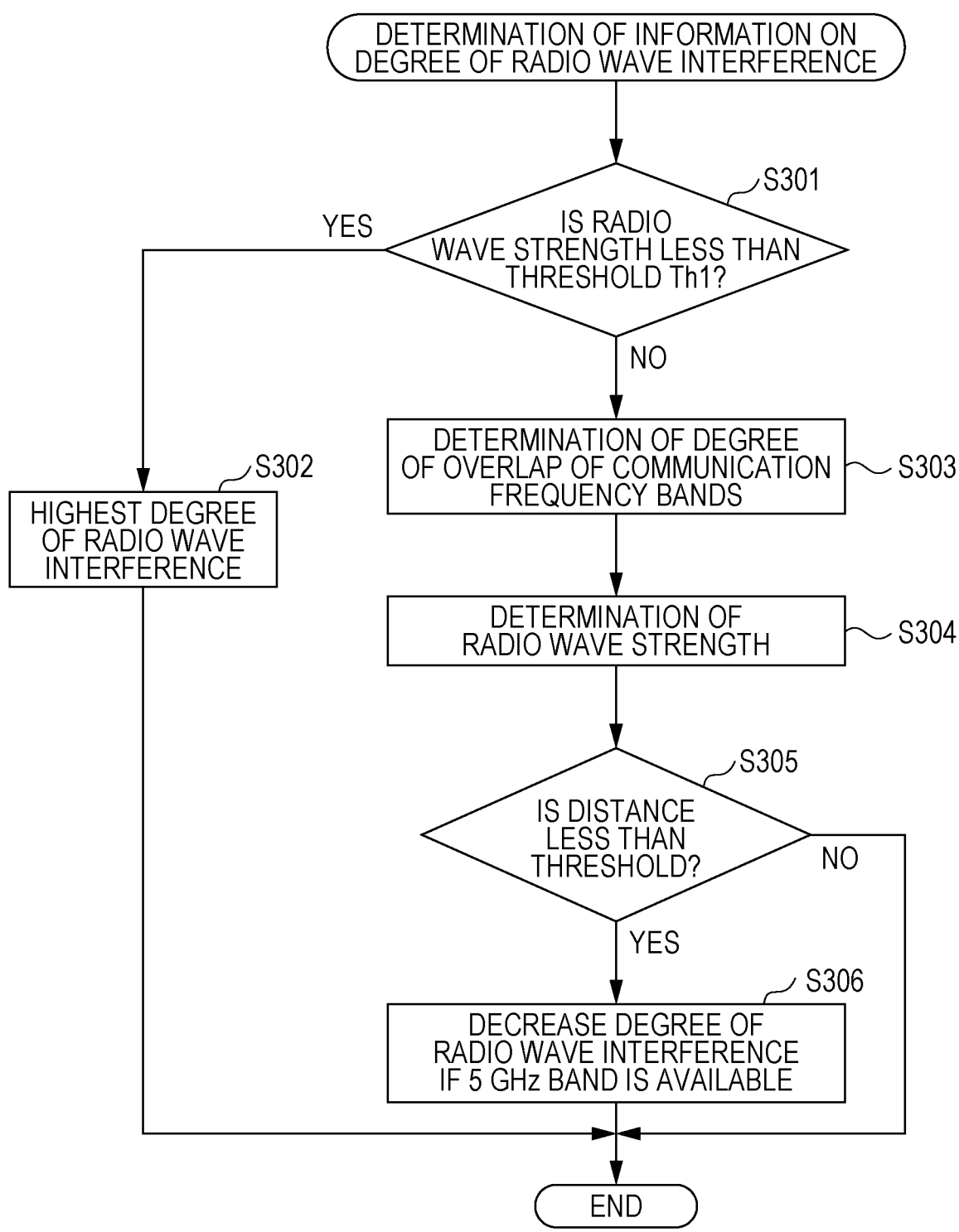
FIG. 12 is another flowchart for describing the processing that obtains the information on the degree of radio wave interference.

FIG. 12 is a flowchart for describing processing that obtains the information on the degree of radio wave interference according to the present modification example. S301 to S304 are the same as S201 to S204 in FIG. 11. The processing unit 110 further determines whether or not the distance between the terminal apparatus 100 and the electronic apparatus 200 that is indicated by the distance information is at or below a given distance threshold (S305). In a case where the distance is at or below the threshold (Yes in S305), the communication frequency band is determined, and processing that relatively decreases the degree of radio wave interference in the 5 GHz is performed (S306). In a case where the distance is above the threshold (No in S305), the processing in S306 is skipped. As described above, in a case where the result of the determination is No in S305, the communication frequency band may be determined, and processing that relatively increased the degree of radio wave interference in the 5 GHz may be additionally performed.

3.2 Example in which the Electronic Apparatus is Connected to the External Access Point The example in which the electronic apparatus 200 activates the internal access point and is connected directly to the terminal apparatus 100 is described with reference to FIG. 4. However, the electronic apparatus 200 may operate in the infrastructure mode, and may be connected to the external access point 20.

Figure 13:
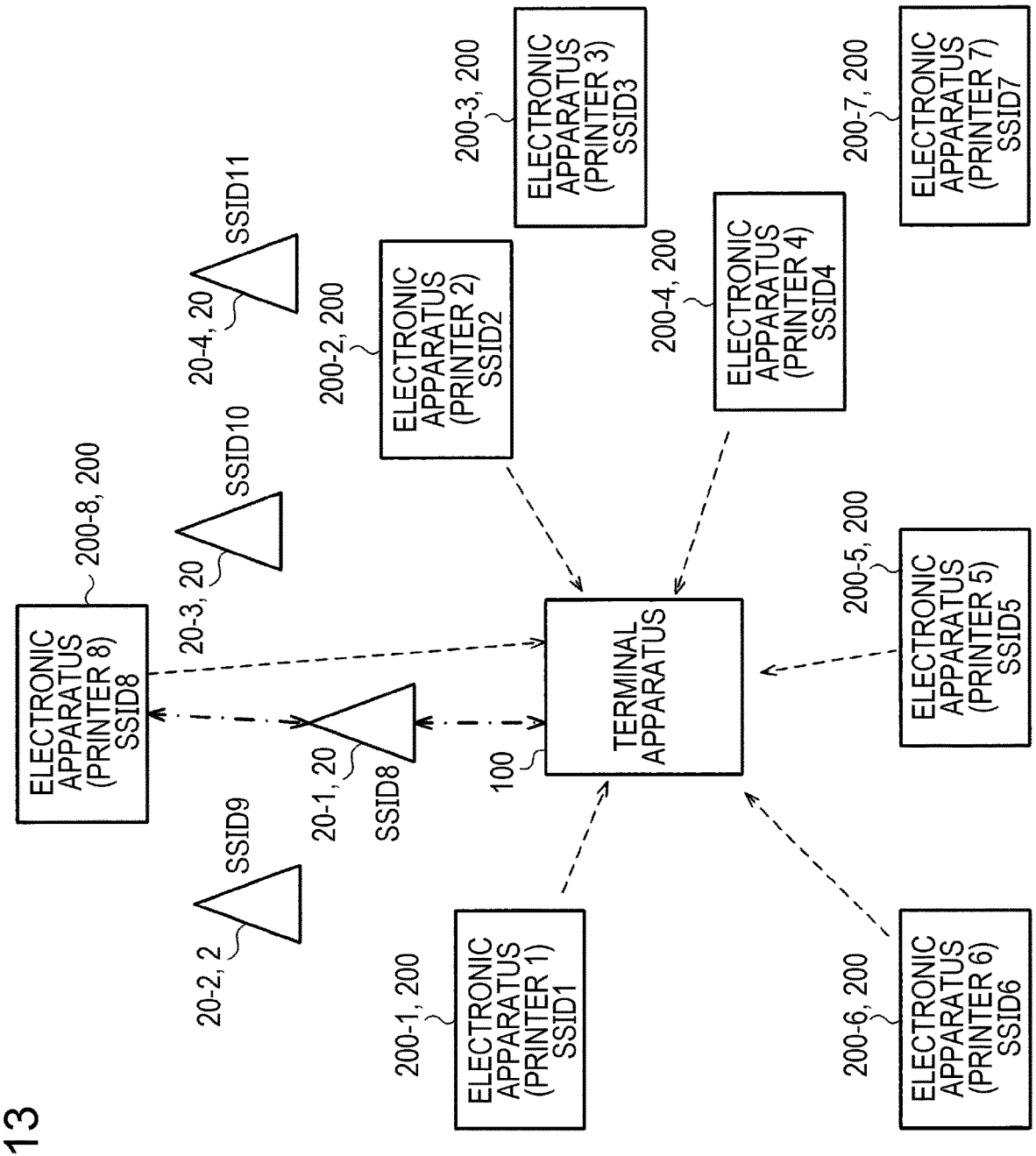
FIG. 13 is a diagram illustrating a specific example of a communication system according to a modification example.

FIG. 13 illustrates an example of a system according the present modification example. As a result of comparison, a difference with FIG. 4 is that an electronic apparatus 200-8 is connected to the external access point 20-1. A printer 8, which is the electronic apparatus 200-8, does not operate as the internal access point, and because of this, does not the Wi-Fi beacon signal. Furthermore, the printer 8 transmits the BLE beacon signal.

The first wireless communication unit 121 of the terminal apparatus 100 transmits the response request packet that designates a broadcast address or a link local multicast address. The response request packet is a packet that requests an apparatus that receives the response request packet, to reply with a response packet that includes identification information on the apparatus. In FIG. 13, the terminal apparatus 100 transmits the response request packet to a network that is formed by the external access point 20-1, and thus the printer 8 replies to the terminal apparatus 100 with a response packet that includes identification information on the printer 8 itself.

For example, the identification information (the first identification information) on the electronic apparatus 200 and the name of the electronic apparatus 200 are included in the response packet from the electronic apparatus 200. However, because the printer 8 does not function as an access point, an SSID of the printer 8 is not acquired.

In an example in FIG. 13, in a case where the terminal apparatus 100 performs printing using the printer 8, the Wi-Fi connection is made to the external access point 20-1. The terminal apparatus 100 cannot know a detail of a connection between the external access point 20-1 and the printer 8. However, if communication between the terminal apparatus 100 and the external access point 20-1 is stabilized, it is estimated that there is a high likelihood that communication with the printer 8 will also be stabilized.

Consequently, for the electronic apparatus 200 that operates in the infrastructure mode, the information on the degree of radio wave interference of a radio wave of the external access point to which the electronic apparatus 200 makes a connection is used as "information on the degree of radio wave interference in communication with an electronic apparatus". In an example in FIG. 13, the information on the degree of radio wave interference of SSID 8 that corresponds to the external access point 20-1 is obtained as the information on the degree of radio wave interference the printer 8.

Figures 14, 15, 16:
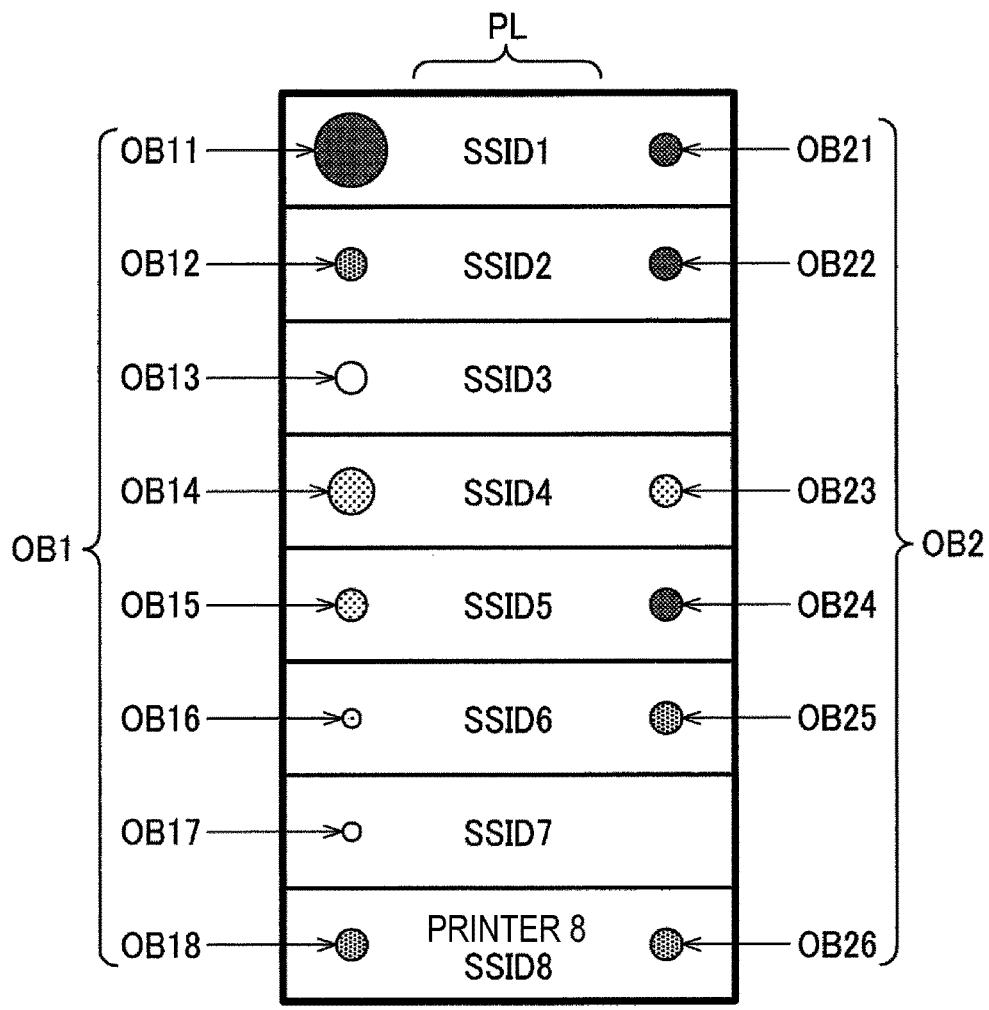
FIG. 14 is a diagram illustrating another example of the display image.
FIG. 15 is a diagram illustrating another example of the data structure of the BLE beacon signal.
FIG. 16 is a diagram illustrating another example of the data structure of the BLE beacon signal.

FIG. 14 illustrates another example of the display image. A display image in FIG. 14 also includes a list PL of the electronic apparatus 200 that are found as a result of the search which uses the first wireless communication scheme. As illustrated in FIG. 13, because the printer 8 is also searched for through the external access point 20-1 in addition to the printer 1 to the printer 7, these are targets for list display. When displaying the printer 8, "printer 8" may be displayed that is a name of the electronic apparatus 200 that is included in the response packet, and "SSID 8" may be displayed that is an SSID of the external access point 20-1 to which the electronic apparatus 200 is connected. Alternatively, as illustrated in FIG. 14, the list PL may be a list that shows both a name of the printer 8, and an SSID of the external access point 20 to which the printer 8 is connected. It is noted that the object OB1 or OB2 are the same as ink FIG. 9 and thus details descriptions thereof are omitted.

3.3 Handover from BLE to Wi-Fi

In a case where, on the display screen on which images in FIG. 9 and other figures are displayed, any electronic apparatus 200 is selected, the first wireless communication unit 121 of the terminal apparatus 100 establishes a Wi-Fi connection to the selected electronic apparatus 200. However, in a case where the electronic apparatus 200 functions as the access point, in order to establish the connection to the selected electronic apparatus 200, there is a need for not only an SSID of the electronic apparatus 200, but also a password that corresponds to the SSID.

In a case where the connection to a target electronic apparatus 200 has been established in the past, the SSID and the password are stored in the storage unit 160 of the terminal apparatus 100 in state of being associated with each other. When the connection is established using the first wireless communication unit 121, the processing unit 110 reads the SSID and the password from the storage unit 160, and performs processing that established a connection using the SSID and the password.

Even in a case where the target electronic apparatus 200 has not been established in the past, or even in a case where the password is erased from the storage unit 160, the inputs the password, and thus it is possible that the Wi-Fi connection is established. However, considering the security, it is desirable that the password is a complicated sequence of letters and numbers, and manual inputting imposes a burden on the user.

Consequently, in the present embodiment, the second wireless communication unit 122 of the terminal apparatus 100 acquires connection information that is used for the first wireless communication scheme, using the beacon signal in compliance with the second wireless communication scheme, and the first wireless communication unit 121 establishes a connection to the electronic apparatus 200 using the connection information. The connection information here is information on an SSID and a password. Furthermore, the connection information may include information that specifies an encryption scheme, and the like.

If this is done, it is possible that the connection between the terminal apparatus 100 and the electronic apparatus 200 switches to the first wireless communication scheme, using a result of communication in compliance with the second wireless communication scheme. The switching among the communication schemes is hereinafter also expressed as handover. The handover in the present embodiment is specifically handover from BLE to Wi-Fi.

FIG. 15 illustrates an example of a data structure of the BLE beacon signal. In addition to the beacon identifier, and the identification information and the status information on the electronic apparatus 200, which are illustrated in FIG. 7, the BLE beacon signal includes an SSID of the electronic apparatus 200 that functions as an access point, and a password that corresponds to the SSID.

Stored in the storage unit 160 of the terminal apparatus 100 is information that results from associating the distance information, the status information, the SSID, and the password with data that results from extending A2 of FIG. 6, specifically the identification information on the electronic apparatus 200. In a case where a given electronic apparatus 200 is selected on a screen on which images in FIG. 9 and other figures are displayed, the processing unit 110 specifies an SSID and a password that correspond to the selected electronic apparatus 200, and performs processing that establishes a Wi-Fi connection to the electronic apparatus 200 using the SSID and the password. If this is done, because the establishment of the Wi-Fi connection can be automated, a reduction in the burden on the user is possible.

It is noted that in FIG. 15, an example in which the password itself is included in the BLE beacon signal is illustrated, but no limitation to this is imposed. For example, a rule for generation of a password may be shared between the terminal apparatus 100 and the electronic apparatus 200, and the processing unit 110 of the terminal apparatus 100 may perform processing that generates a password according to the rule for generation. Specifically, the processing unit 110 performs conversion processing that is based on the MAC address which is acquired with the BLE beacon signal, and generates a password. It is noted that the processing unit 110 may be capable of generating a password that corresponds to an SSID, and a target for the conversation processing may be information other than the MAC address. If this is done, because there is no need to broadcast a password with the BLE beacon signal, it is possible that the security is improved.

3.4 Distance Calculation that is Based on the Radio Wave Strength Information on BLE FIG. 16 illustrates an example of a data structure of the BLE beacon signal. In addition to the beacon identifier, and the identification information and the status information on the electronic apparatus 200, which are illustrated in FIG. 7, the BLE beacon signal includes information on a reference radio wave strength. The reference radio wave strength is a received signal strength indication (RSSI) of the beacon signal in a reception side apparatus, which results when the reception side apparatus is installed at a location that is at a reference distance away from a beacon signal transmission side apparatus. The reference distance, for example, is 1 m, but may be set to be a different distance.

Generally, it is known that the radio wave strength is inversely proportional to a square of a distance and thus becomes weakened over distance. Consequently, if the radio wave strength at the reference distance is known, the distance between the terminal apparatus 100 and the electronic apparatus 200 can be calculated based on the radio wave strength of the BLE beacon signal that is actually received. Specifically, because a ratio of the distance between the terminal apparatus 100 and the electronic apparatus 200 to a reference distance is known, it is possible that the distance information is calculated in meters or the like that is the unit of distance.

In the same manner as in FIG. 9 and other figures, an object that indicates the distance information in an identifiable manner may be an object in the shape of a circle, which varies in density. For example, the processing unit 110 performs processing that displays the distance information in an identifiable manner, using an object in which the shorter the distance, the higher the density, and the longer the distance, the lower the density. However, a mode for displaying an object is not limited to this. The object that expresses an estimated distance as a numerical value such as "3 m" may be displayed.

3.5 System and Program

Furthermore, a target in which the technique according to the present embodiment finds application is not limited to the terminal apparatus 100 that has been described above.

The technique according to the present embodiment, as illustrated in FIG. 1, can find application in the communication system 10 that includes the terminal apparatus 100 and the electronic apparatus 200, which are described above. The communication system 10, as illustrated in FIG. 4 or 13, may include multiple electronic apparatuses 200.

Furthermore, one or several of, or most of the processing operations by the terminal apparatus 100 or the electronic apparatus 200 according to the present embodiment may be realized by a program. In this case, a CPU or the like executes the program, and thus the terminal apparatus 100 and the like according to the present embodiment are realized. Specifically, the program that is stored on a non-volatile information storage medium is read and the processor such as the CPU executes the program that is read. The information storage medium here is a computer-readable recording medium. A program, data, and the like are stored in the information storage medium. A function of the information storage medium can be realized by an optical disk, such as a DVD or a CD, an HDD, a memory, or the like. Then, the processor such as the CPU performs various processing operations according to the present embodiment based on the program that is stored in the information storage medium. That is, a program that causes a computer to function as each unit according to the present embodiment is stored in the information storage medium.

Furthermore, the technique according to the present embodiment can find application in a display control method that performs one or several of, or all of the processes that are illustrated in FIGS. 10 to 12, a communication control method, a method of controlling the terminal apparatus 100, or a method of operating the terminal apparatus 100. A display control method according to the present embodiment includes obtaining information on the degree of radio wave interference in communication with an electronic apparatus 200 in compliance with a first wireless communication scheme, obtaining information on a distance to the electronic apparatus 200 based on a beacon signal that is received from the electronic apparatus 200 using a second wireless communication scheme that is different from the first wireless communication scheme, and performing processing that displays on a display unit a display image that is based on the information on the degree of radio wave interference and the information on the distance.

The embodiments and the modification examples thereof in which the invention finds application are described above, but the invention is not limited to the embodiments and the modification examples thereof as are. At stages of implementation, a constituent element can be modified and thus a modification thereto can be realized within the scope that does not depart from the gist of the invention. Furthermore, various inventions can be conceived and be reduced to practice by suitably combining the multiple constituent elements that are disclosed in each of the embodiments or each of the modification examples thereof, which are described above. For example, of all constituent elements that are described in each of the embodiments or each of the modification examples thereof, several constituent elements may be deleted. Moreover, the constituent elements that are described in the different embodiments or the different modification examples thereof may be suitably combined. Furthermore, in the specification or the drawings, a term that is described at least once together with a different term that has a broader meaning or the same meaning can be replaced with the different term, throughout the specification or the drawings. In this manner, various modifications or applications are possible within the scope that does not depart from the gist of the invention.

The entire disclosure of Japanese Patent Application No. 2018-032858, filed Feb. 27, 2018 is expressly incorporated by reference herein.

What is claimed is:

1. A terminal apparatus comprising:
   a first wireless communication chip, the first wireless communication chip being structured to communicate wirelessly with an electronic apparatus using a first wireless communication scheme;
   a second wireless communication chip, the second wireless communication chip being structured to communicate wirelessly with the electronic apparatus using a second wireless communication scheme different from the first wireless communication scheme; and
   a processor that performs communication control of the first wireless communication chip and the second wireless communication chip,
   wherein the processor performs processing that displays on a display a display image that is based on information on the degree of radio wave interference in communication with the electronic apparatus in compliance with the first wireless communication scheme, and information on a distance to the electronic apparatus, which is obtained based on a beacon signal that is received using the second wireless communication scheme, and
   wherein the first wireless communication scheme is Wi-Fi and the second wireless communication scheme is Bluetooth Low Energy.

2. The terminal apparatus according to claim 1, wherein the processor obtains the information on the degree of radio wave interference, based on a degree of overlap of communication frequency bands that are used for wireless communication in compliance with the first wireless communication scheme, and on a radio wave strength of a radio wave that is used for wireless communication in compliance with the first wireless communication scheme.

3. The terminal apparatus according to claim 2, wherein the first wireless communication chip performs communication in a 2.4 GHz band that complies with WI-Fi standards, or communication in a 5 GHz band, and
   wherein the processor obtains the information on the degree of radio wave interference based on the degree of overlap of the communication frequency bands, the radio wave strength, and which one of the 2.4 GHz band and the 5 GHz band is used to perform wireless communication.

4. The terminal apparatus according to claim 3, wherein, in a case where it is determined that a distance that is indicated by the information on the distance is at or below a given threshold, the processor obtains the information on the degree of radio wave interference, in such a manner that the degree of radio wave interference in a case where the wireless communication in compliance with the first wireless communication scheme is in the 5 GHz band is lower than the degree of radio wave interference in a case where the wireless communication in compliance with the first wireless communication scheme is in the 2.4 GHz band.

5. The terminal apparatus according to claim 1, wherein the first wireless communication chip searches for the electronic apparatus available for communication, using the first wireless communication scheme, and
   wherein the processor list-displays multiple electronic apparatuses that are found as a result of the search, and performs processing that displays on the display the display image in a display mode, which results from associating an object that indicates the information on the degree of radio wave interference and the information on the distance in an identifiable manner, with each of the list-displayed multiple electronic apparatuses.

6. The terminal apparatus according to claim 5, wherein the second wireless communication unit acquires status information on the electronic apparatus that transmits the beacon signal, based on the beacon signal, and
   wherein the processor performs processing that displays on the display the display image in the display mode, which results from associating a second object that indicates the status information in an identifiable manner, with each of the list-displayed multiple electronic apparatuses.

7. The terminal apparatus according to claim 1,
   wherein the second wireless communication unit acquires connection information that is used for the first wireless communication scheme, using the second wireless communication scheme, and
   wherein the first wireless communication chip establishes a connection to the electronic apparatus available for communication using the first wireless communication scheme, through the use of the connection information.

8. A communication system comprising:
   the terminal apparatus according to claim 1; and
   the electronic apparatus.

9. A computer-readable non-transitory recording medium on which a program is stored, the program causing a computer to function as:
   a first wireless communication chip that communicates wirelessly with an electronic apparatus using a first wireless communication scheme;
   a second wireless communication chip that communicates wirelessly with the electronic apparatus using a second wireless communication scheme different from the first wireless communication scheme; and
   a processor that performs communication control of the first wireless communication chip and the second wireless communication chip,
   wherein the processor performs processing that displays on a display a display image that is based on information on the degree of radio wave interference in communication with the electronic apparatus in compliance with the first wireless communication scheme, and information on a distance to the electronic apparatus, which is obtained based on a beacon signal that is received using the second wireless communication scheme, and wherein the first wireless communication scheme is Wi-Fi and the second wireless communication scheme is Bluetooth Low Energy.

10. A display control method comprising:

obtaining information on a degree of radio wave interference in communication with an electronic apparatus available for communication using a first wireless communication scheme;

obtaining information on a distance to the electronic apparatus based on a beacon signal that is received from the electronic apparatus using a second wireless communication scheme different from the first wireless communication scheme; and performing processing that displays on a display a display image that is based on the information on the degree of radio wave interference and the information on the distance, wherein the first wireless communication scheme is Wi-Fi and the second wireless communication scheme is Bluetooth Low Energy.

\* \* \* \* \*